(12) United States Patent
Fan et al.

(10) Patent No.: US 11,889,334 B2
(45) Date of Patent: Jan. 30, 2024

(54) METHOD AND APPARATUS FOR MEASUREMENT REPORT

(71) Applicant: Telefonaktiebolaget LM Ericsson (publ), Stockholm (SE)

(72) Inventors: Rui Fan, Beijing (CN); Oumer Teyeb, Solna (SE); Icaro Leonardo J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/284,230

(22) Filed: Feb. 25, 2019

(65) Prior Publication Data

US 2019/0253908 A1    Aug. 15, 2019

Related U.S. Application Data

(63) Continuation of application No. PCT/CN2018/091645, filed on Jun. 15, 2018.

(30) Foreign Application Priority Data

Jun. 16, 2017  (WO) ................ PCT/CN2017/088798
Aug. 11, 2017  (WO) ................ PCT/CN2017/097150
(Continued)

(51) Int. Cl.
*H04W 24/10*    (2009.01)
*H04W 24/08*    (2009.01)
(Continued)

(52) U.S. Cl.
CPC ........... *H04W 24/10* (2013.01); *H04W 24/08* (2013.01); *H04W 36/0069* (2018.08); *H04W 36/0085* (2018.08); *H04W 88/06* (2013.01)

(58) Field of Classification Search
None
See application file for complete search history.

(56) References Cited

U.S. PATENT DOCUMENTS 11,064,499 B2 *  7/2021  Qin .................. H04W 24/10
2011/0250880 A1  10/2011  Olsson
(Continued)

FOREIGN PATENT DOCUMENTS

CN    102388652 A    3/2012
CN    103125133 A    5/2013
(Continued)

OTHER PUBLICATIONS

3GPP TSG-RAN WG2 Meeting #85bis (R2-141289), Apr. 2014, pp. 1-5. (Year: 2014).*
(Continued)

*Primary Examiner* — Nicholas Sloms
(74) *Attorney, Agent, or Firm* — Withrow & Terranova, PLLC

(57) ABSTRACT

Various embodiments of the present disclosure provide a method for measurement information. The method, which may be implemented at a terminal device, comprises obtaining measurement information based at least in part on configurations of a master network node and a secondary network node. The terminal device is connected to the master network node and the secondary network node. The method further comprises transmitting a report including the measurement information that comprises frequency information to the master network node, in response to a failure related to the secondary network node.

11 Claims, 10 Drawing Sheets

(30) Foreign Application Priority Data

Aug. 21, 2017 (WO) ............... PCT/CN2017/098372
Feb. 6, 2018 (WO) ............... PCT/CN2018/075502

(51) Int. Cl.
H04W 36/00 (2009.01)
H04W 88/06 (2009.01)

(56) References Cited

U.S. PATENT DOCUMENTS

| | | | |
|---|---|---|---|
| 2012/0044910 A1 | 2/2012 | Maeda et al. | |
| 2013/0114568 A1* | 5/2013 | Sagae | H04W 36/30 370/332 |
| 2013/0183970 A1* | 7/2013 | Chen | H04W 36/30 455/436 |
| 2013/0322376 A1* | 12/2013 | Marinier | H04W 72/06 370/329 |
| 2015/0045052 A1* | 2/2015 | Pao | H04W 88/06 455/453 |
| 2015/0133122 A1 | 5/2015 | Chen | |
| 2015/0296438 A1* | 10/2015 | Wu | H04L 45/28 370/221 |
| 2016/0212753 A1 | 7/2016 | Wu | |
| 2016/0219604 A1* | 7/2016 | Fujishiro | H04W 72/085 |
| 2016/0227524 A1* | 8/2016 | Choi | H04W 72/1289 |
| 2016/0242064 A1 | 8/2016 | Lee et al. | |
| 2016/0337925 A1* | 11/2016 | Fujishiro | H04W 16/32 |
| 2017/0041880 A1* | 2/2017 | Ouchi | H04W 16/32 |
| 2017/0064613 A1* | 3/2017 | Harada | H04W 48/12 |
| 2017/0223564 A1* | 8/2017 | Dinan | H04W 24/10 |
| 2017/0265172 A1* | 9/2017 | Futaki | H04W 16/14 |
| 2017/0280363 A1* | 9/2017 | Tenny | H04W 8/14 |
| 2017/0303153 A1* | 10/2017 | Siomina | H04W 24/10 |
| 2017/0331577 A1* | 11/2017 | Parkvall | H04L 5/1469 |
| 2018/0020462 A1* | 1/2018 | Xiong | H04L 1/1887 |
| 2018/0063736 A1* | 3/2018 | Sadeghi | H04W 24/10 |
| 2018/0115357 A1* | 4/2018 | Park | H04B 7/04 |
| 2018/0176835 A1* | 6/2018 | Park | H04W 36/0061 |
| 2018/0192384 A1* | 7/2018 | Chou | H04W 72/044 |
| 2018/0227723 A1* | 8/2018 | Takahashi | H04W 4/24 |
| 2018/0241464 A1* | 8/2018 | Michaels | H04W 56/0045 |
| 2018/0249463 A1* | 8/2018 | Huang | H04W 24/10 |
| 2019/0045398 A1* | 2/2019 | Chai | H04B 17/309 |
| 2019/0230580 A1* | 7/2019 | Kim | H04W 48/16 |
| 2020/0029356 A1* | 1/2020 | Choi | H04L 5/0053 |

FOREIGN PATENT DOCUMENTS

| | | |
|---|---|---|
| CN | 103733691 A | 4/2014 |
| CN | 104885511 A | 9/2015 |
| CN | 105472667 A | 4/2016 |
| CN | 105722213 A | 6/2016 |
| CN | 106031292 A | 10/2016 |
| CN | 106465203 A | 2/2017 |
| EP | 3051916 A1 | 8/2016 |
| JP | 2015159608 A | 9/2015 |
| RU | 2456773 C2 | 7/2012 |
| RU | 2579761 C2 | 4/2016 |
| WO | 2015178835 A1 | 11/2015 |
| WO | 2016020146 A1 | 2/2016 |
| WO | 2016038763 A1 | 3/2016 |
| WO | 2016053174 A1 | 4/2016 |
| WO | 2016077701 A1 | 5/2016 |
| WO | 2016122255 A1 | 8/2016 |
| WO | 2018228560 A1 | 12/2018 |
| WO | 2018231115 A1 | 12/2018 |

OTHER PUBLICATIONS

Meng, Technology Day 2016—The Road to 5G, Rohde & Scwarz, Jun. 2016, pp. 1-10. (Year: 2016).*
3GPP TS.37.340 V0.1.0 (May 2017), pp. 1-13. (Year: 2017).*
Author Unknown, "Technical Specification Group Radio Access Network; Study on new radio access technology; Radio access architecture and interfaces (Release 14)," Technical Report 38.801, Version 14.0.0, 3GPP Organizational Partners, Mar. 2017, 91 pages.
Author Unknown, "Technical Specification Group Radio Access Network; Evolved Universal Terrestrial Radio Access (E-UTRA) and Evolved Universal Terrestrial Radio Access Network (E-UTRAN); Overal description; Stage 2 (Release 14)," Technical Specification 36.300, Version 14.2.0, 3GPP Organizational Partners, Mar. 2017, 330 pages.
Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.2.2, 3GPP Organizational Partners, Apr. 2017, 721 pages.
Author Unknown, "Technical Specification Group Radio Access Network; NR; Radio Resource Control (RRC); Protocol Specification (Release 15)," Technical Specification 38.331, Version 0.0.3, 3GPP Organizational Partners, May 2017, 20 pages.
ETSI MCC, "R2-1704001: Report of 3GPP TSG RAN2 meeting #97bis, Spokane, USA," Third Generation Partnership Project (3GPP), TSG-RAN WG2 meeting #98, May 15-19, 2017, 173 pages, Hangzhou, China.
International Search Report and Written Opinion for International Patent Application No. PCT/CN2018/091645, dated Sep. 5, 2018, 8 pages.
Author Unknown, "Technical Specification Group Radio Access Network; NR; User Equipment (UE) radio transmission and reception; Part 1: Range 1 Standalone (Release 15)," 3GPP TS 38.101-1, Version 0.0.1, Aug. 2017, 3GPP Organizational Partners, 11 pages.
Catt, "R2-1704220: Consideration on remaining issues of SCG SRB for IWK," 3GPP TSG-RAN WG2 Meeting #98, May 15-19, 2017, Hangzhou, China, 2 pages.
CATT, "R2-170889: Open issues of SCG Failure," 3GPP TSG-RAN WG2 #99, Aug. 21-25, 2017, Berlin, Germany, 5 pages.
Ericsson, "R2-1711131: Remaining issues on SCG Failure," 3GPP TSG-RAN WG2 #99bis, Oct. 9-13, 2017, Prague, Czech Republic, 3 pages.
Huawei et al., "R2-141289: Discussion on RRM measurements for SCG in dual connectivity," 3GPP TSG-RAN WG2 Meeting #85bis, Mar. 31-Apr. 4, 2014, Valencia, Spain, 5 pages.
Nokia et al., "R2-1704350: UE measurements upon S-RLF for LTE-NR DC," 3GPP TSG-RAN WG2 Meeting #98, May 15-19, 2017, Hangzhou, China, 2 pages.
Samsung, "R2-1705062: SCG Failure Handling," 3GPP TSG-RAN WG2 NR#98, May 15-19, 2017, Hangzhou, China, 3 pages.
Extended European Search Report for European Patent Application No. 18818929.4, dated Jul. 25, 2019, 12 pages.
International Search Report and Written Opinion for International Patent Application No. PCT/SE2018/050451, dated Jul. 26, 2018, 16 pages.
Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.6.1, Jul. 2017, 3GPP Organizational Partners, 12 pages.
Ericsson, "Tdoc R2-1706633: Measurement in case of S-RLF," 3GPP TSG-RAN WG2 NR AH#2, Jun. 27-29, 2017 , Qingdao, China, 4 pages.
Samsung, "R2-1709234: Remaining Issues for UE Procedures on SCG Failure," 3GPP TSG-RAN WG2#99 Meeting, Aug. 21-25, 2017, Berlin, Germany, 4 pages.
Notice of Reasons for Refusal for Japanese Patent Application No. 2019-563074, dated Feb. 5, 2021, 13 pages.
Official Action for Russian Patent Application No. 2020137253, dated May 21, 2021, 7 pages.
Examination Report for Indian Patent Application No. 201947007436, dated Mar. 23, 2021, 5 pages.
Examination Report for European Patent Application No. 18818929. 4, dated Mar. 29, 2021, 7 pages.
Examination Report for European Patent Application No. 18818929. 4, dated Jun. 13, 2022, 8 pages.

(56) References Cited

OTHER PUBLICATIONS

Office Action for Canadian Patent Application No. 3061830, dated Sep. 2, 2022, 6 pages.
Official Action for Russian Patent Application No. 2019136528, dated Jun. 9, 2020, 19 pages.
First Office Action for Chinese Patent Application No. 201880003318.1, dated Nov. 2, 2020, 13 pages.
Office Action for Canadian Patent Application No. 3061830, dated Oct. 16, 2023, 5 pages.
First Office Action for Chinese Patent Application No. 202110359612.X, dated Sep. 21, 2023, 7 pages.
Extended European Search Report for European Patent Application No. 23188158.2, dated Sep. 21, 2023, 17 pages.

* cited by examiner

METHOD AND APPARATUS FOR MEASUREMENT REPORT

RELATED APPLICATIONS

The present application is a continuation of International Application Number PCT/CN2018/091645 filed Jun. 15, 2018, which claims the benefit of International Application Numbers PCT/CN2017/088798 filed Jun. 16, 2017, PCT/CN2017/097150 filed Aug. 11, 2017, PCT/CN2017/098372 filed Aug. 21, 2017, and PCT/CN2018/075502 filed Feb. 6, 2018, the disclosures of which are incorporated herein by reference in their entireties.

FIELD OF THE INVENTION

The present disclosure generally relates to communication networks, and more specifically, to a method and apparatus for measurement report.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators are continually facing challenges to deliver value and convenience to consumers by, for example, providing compelling network services and performance. With the rapid development of networking and communication technologies, a wireless network, such as a long term evolution (LTE)/fourth generation (4G) network or a new radio (NR)/fifth generation (5G) network, can support a dual connectivity (DC) operation of a terminal device. As such, the terminal device may be configured to utilize radio resources provided by two distinct schedulers, for example, located in different network nodes connected via an interface cross two communication networks. In this case, it may be desirable to achieve performance advantages of the DC while considering different configurations of the network nodes.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Communication networks supporting a DC operation of a terminal device may require coordination of a master network node (also called as master node (MN)) and a secondary network node (also called as secondary node (SN)) for the terminal device. For example, the MN may be informed that a connection from the terminal device to the SN is malfunctioning or broken, and accordingly get relevant measurement results from the terminal device. However, the MN may not be able to understand the measurement results collected according to the configuration of the SN. Therefore, there may be a need to provide an effective report mechanism for enabling the MN to interpret the measurement results associated with the SN.

The present disclosure proposes a first solution for report of measurement results in a network supporting DC, which can make measurement results associated with a SN comprehensible to a MN, thereby reducing reconfiguration time of the terminal device and recovering from a failure related to the SN in a more efficient way.

According to a first aspect of the first proposed solution, there is provided a method implemented at a terminal device. The method comprises obtaining measurement information based at least in part on configurations of a MN and a SN. The terminal device is connected to the MN and the SN. The method further comprises transmitting a report including the measurement information to the MN, in response to a failure related to the SN.

According to a second aspect of the first proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the first aspect of the first proposed solution.

According to a third aspect of the first proposed solution, there is provided a computer-readable medium having computer program codes embodied thereon for use with a computer. The computer program codes may comprise code for performing any step of the method according to the first aspect of the first proposed solution.

According to a fourth aspect of the first proposed solution, there is provided an apparatus. The apparatus comprises an obtaining unit and a transmitting unit. In accordance with some exemplary embodiments, the obtaining unit may be operable to carry out at least the obtaining step of the method according to the first aspect of the first proposed solution. The transmitting unit may be operable to carry out at least the transmitting step of the method according to the first aspect of the first proposed solution.

According to a fifth aspect of the first proposed solution, there is provided a method implemented at a network node operating as an MN. The method comprises receiving a report including measurement information from a terminal device which is connected to the MN and a SN. The measurement information may be based at least in part on configurations of the MN and the SN. The method further comprises interpreting the measurement information.

In accordance with an exemplary embodiment, the measurement information may be interpreted for enabling a reconfiguration procedure for the terminal device. For example, the reconfiguration procedure may comprise: determining another SN for the terminal device, based at least in part on the measurement information; and transmitting at least part of the measurement results associated with serving frequencies configured by the SN to the another SN.

According to a sixth aspect of the first proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the fifth aspect of the first proposed solution.

According to a seventh aspect of the first proposed solution, there is provided a computer-readable medium having computer program codes embodied thereon for use with a computer. The computer program codes may comprise code for performing any step of the method according to the fifth aspect of the first proposed solution.

According to an eighth aspect of the first proposed solution, there is provided an apparatus. The apparatus may comprise a receiving unit and an interpreting unit. In accordance with some exemplary embodiments, the receiving unit may be operable to carry out at least the receiving step of the method according to the fifth aspect of the first proposed solution. The interpreting unit may be operable to carry out at least the interpreting step of the method according to the fifth aspect of the first proposed solution.

According to a ninth aspect of the first proposed solution, there is provided a method implemented at a network node operating as an SN. The method comprises determining an association between a serving frequency configured by the SN and a measurement result associated with the serving frequency. The serving frequency may be configured for a terminal device which is connected to a MN and the SN. The method further comprises providing the association to the MN for interpreting measurement information related to the terminal device. The measurement information may comprise at least the measurement result and is based at least in part on configurations of the MN and the SN.

According to a tenth aspect of the first proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the ninth aspect of the first proposed solution.

According to an eleventh aspect of the first proposed solution, there is provided a computer-readable medium having computer program codes embodied thereon for use with a computer. The computer program codes may comprise code for performing any step of the method according to the ninth aspect of the first proposed solution.

According to a twelfth aspect of the first proposed solution, there is provided an apparatus. The apparatus comprises a determining unit and a providing unit. In accordance with some exemplary embodiments, the determining unit may be operable to carry out at least the determining step of the method according to the ninth aspect of the first proposed solution. The providing unit may be operable to carry out at least the providing step of the method according to the ninth aspect of the first proposed solution.

In accordance with an exemplary embodiment, the measurement information may comprise measurement results associated with serving frequencies configured by the MN and the SN.

In accordance with an exemplary embodiment, the report may indicate an association between a serving frequency configured by the SN and a measurement result associated with the serving frequency.

In accordance with an exemplary embodiment, the association may be indicated by an indication of the serving frequency configured by the SN.

In accordance with an exemplary embodiment, the measurement result associated with the serving frequency configured by the SN may comprise: an identifier of a best measured cell on the serving frequency; and an indication of reference signal quality for the best measured cell.

In accordance with an exemplary embodiment, the measurement result associated with the serving frequency configured by the SN may further comprise: an identifier of a best neighbor of the best measured cell; and an indication of reference signal quality for the best neighbor.

In accordance with an exemplary embodiment, the association may be indicated by an index of a serving cell on the serving frequency configured by the SN. The index of the serving cell may have a mapping relationship with the serving frequency. For example, the mapping relationship may be gathered by the MN from the SN.

In accordance with an exemplary embodiment, the measurement result associated with the serving frequency configured by the SN may comprise: an index of a serving cell on the serving frequency; an indication of reference signal quality for the serving cell; an identifier of a best neighbor of the serving cell; and an indication of reference signal quality for the best neighbor.

In accordance with an exemplary embodiment, the measurement results associated with the serving frequencies configured by the MN may be separated in the report from the measurement results associated with the serving frequencies configured by the SN.

In accordance with an exemplary embodiment, the index of the serving cell may be allocated by the SN without coordination with the MN.

In accordance with an exemplary embodiment, the index of the serving cell may be allocated by coordination of the MN and the SN.

In accordance with an exemplary embodiment, the measurement information may further comprise measurement results associated with beams used by the MN and the SN.

In accordance with an exemplary embodiment, the report may comprise a failure message for informing the MN of the failure related to the SN.

In some exemplary embodiments, the MN may need to select a target SN for the terminal device, and accordingly provide relevant measurement results from the terminal device to the target SN. In addition, the SN currently connected with the terminal device also may select a target SN for the terminal device to change to be connected to, and accordingly provide relevant measurement results from the terminal device to the target SN. However, the target SN may not be able to understand the measurement results collected according to the configurations of the MN or the original SN. Therefore, there may be a need to enable the target SN to interpret the measurement results associated with the MN and/or the original SN.

Alternatively or in addition to the first proposed solution, the present disclosure proposes a second solution for report of measurement results in a network supporting DC, which can make measurement results associated with a MN or an old SN comprehensible to a new SN, thereby reducing reconfiguration time of the terminal device and connecting the terminal device to the new SN in a more efficient way.

According to a first aspect of the second proposed solution, there is provided a method implemented at a network node operating as an MN. The method comprises obtaining measurement information associated with a terminal device which is connected at least to the MN. The method further comprises transmitting a report including the measurement information to a first SN. The report may indicate frequency information associated with the measurement information.

According to a second aspect of the second proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the first aspect of the second proposed solution.

According to a third aspect of the second proposed solution, there is provided a computer-readable medium having computer program codes embodied thereon for use with a computer. The computer program codes may comprise code for performing any step of the method according to the first aspect of the second proposed solution.

According to a fourth aspect of the second proposed solution, there is provided an apparatus. The apparatus comprises an obtaining unit and a transmitting unit. In accordance with some exemplary embodiments, the obtaining unit may be operable to carry out at least the obtaining step of the method according to the first aspect of the second proposed solution. The transmitting unit may be operable to carry out at least the transmitting step of the method according to the first aspect of the second proposed solution.

According to a fifth aspect of the second proposed solution, there is provided a method implemented at a first SN. The method comprises receiving a report including measurement information from a MN. The measurement information may be associated with a terminal device which is connected at least to the MN. The report may indicate frequency information associated with the measurement information. The method further comprises interpreting the measurement information.

According to a sixth aspect of the second proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the fifth aspect of the second proposed solution.

According to a seventh aspect of the second proposed solution, there is provided a computer-readable medium having computer program codes embodied thereon for use with a computer. The computer program codes may comprise code for performing any step of the method according to the fifth aspect of the second proposed solution.

According to an eighth aspect of the second proposed solution, there is provided an apparatus. The apparatus comprises a receiving unit and an interpreting unit. In accordance with some exemplary embodiments, the receiving unit may be operable to carry out at least the receiving step of the method according to the fifth aspect of the second proposed solution. The interpreting unit may be operable to carry out at least the interpreting step of the method according to the fifth aspect of the second proposed solution.

According to a ninth aspect of the second proposed solution, there is provided a method implemented at a second SN. The method comprises obtaining measurement information associated with a terminal device which is connected to a MN and the second SN. The method further comprises transmitting a report including the measurement information to the MN. The report may indicate frequency information associated with the measurement information.

According to a tenth aspect of the second proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the ninth aspect of the second proposed solution.

According to an eleventh aspect of the second proposed solution, there is provided a computer-readable medium having computer program codes embodied thereon for use with a computer. The computer program codes may comprise code for performing any step of the method according to the ninth aspect of the second proposed solution.

According to a twelfth aspect of the second proposed solution, there is provided an apparatus. The apparatus comprises an obtaining unit and a transmitting unit. In accordance with some exemplary embodiments, the obtaining unit may be operable to carry out at least the obtaining step of the method according to the ninth aspect of the second proposed solution. The transmitting unit may be operable to carry out at least the transmitting step of the method according to the ninth aspect of the second proposed solution.

In accordance with an exemplary embodiment, the measurement information may be obtained from the terminal device. For example, the measurement information may comprise a measurement result associated with a serving frequency configured by the MN.

In accordance with an exemplary embodiment, the terminal device may be connected to the MN and a second SN. The measurement information may be obtained from the second SN. For example, the measurement information may comprise a measurement result associated with a serving frequency configured by the second SN.

In accordance with an exemplary embodiment, said obtaining the measurement information associated with the terminal device may further comprise obtaining the frequency information associated with the measurement information from the second SN.

In accordance with an exemplary embodiment, the measurement information comprises a measurement result associated with at least one of serving frequencies configured by the MN and the second SN.

In accordance with an exemplary embodiment, the frequency information may comprise at least one of: an indication of a serving frequency and a physical cell identifier.

In accordance with an exemplary embodiment, the transmission and/or reception of the report may be in response to a determination of the first SN.

In accordance with an exemplary embodiment, the determination of the first SN may be initiated by the MN or the second SN to which the terminal device is connected.

In some exemplary embodiments, a MN may be informed that a connection from a terminal device to a SN is malfunctioning or broken, and accordingly get relevant measurement results in a failure report from the terminal device. The failure report may comprise some frequency information such as a carrier frequency associated with a measurement object. However, the frequency information about a center carrier frequency may not be available for a NR measurement object in the context of NR. Therefore, there may be a need to enhance the provision of frequency information for a NR measurement object.

Alternatively or in addition to the first proposed solution and/or the second proposed solution, the present disclosure proposes a third solution for report of measurement results in a network supporting DC, which can enable some frequency information of a measurement object to be included in a report (such as a failure report or a measurement report) for the measurement object, thereby reducing configuration time and maintain a communication connection in a more efficient way.

According to a first aspect of the third proposed solution, there is provided a method implemented at a network node operating as an SN. The method comprises receiving a report including measurement information for a terminal device from a MN. The terminal device is connected at least to the MN. The report indicates frequency information for the measurement information. The method further comprises obtaining the frequency information from the report. The frequency information comprises at least one of a frequency location of a synchronization signal and a frequency location of a reference signal.

In accordance with an exemplary embodiment, the frequency information may further comprise an offset of a synchronization signal block (SSB). In accordance with an exemplary embodiment, the frequency location of the synchronization signal may comprise a frequency location where the synchronization signal/physical broadcast channel (SS/PBCH) block is transmitted. In accordance with an exemplary embodiment, the frequency location of the reference signal may comprise a reference location from which the channel state information-reference signal (CSI-RS) frequency location can be derived.

According to a second aspect of the third proposed solution, there is provided an apparatus implemented in a network node operating as an SN. The apparatus comprises one or more processors and one or more memories comprising computer program codes. The one or more memories and the computer program codes may be configured to, with the one or more processors, cause the apparatus at least to perform any step of the method according to the first aspect of the third proposed solution.

According to a third aspect of the third proposed solution, there is provided a computer-readable medium having computer program codes embodied thereon which, when executed on a computer, cause the computer to perform any step of the method according to the first aspect of the third proposed solution.

According to a fourth aspect of the third proposed solution, there is provided an apparatus implemented in a network node operating as an SN. The apparatus comprises a receiving unit and an obtaining unit. In accordance with some exemplary embodiments, the receiving unit may be operable to carry out at least the receiving step of the method according to the first aspect of the third proposed solution. The obtaining unit may be operable to carry out at least the obtaining step of the method according to the first aspect of the third proposed solution.

Based at least in part on any of the first proposed solution, the second proposed solution and the third proposed solution, the present disclosure proposes a fourth solution for measurement information in a network supporting DC, which can enable frequency information of a measurement object to be included in measurement information about the measurement object, thereby reducing configuration time and maintain a communication connection in a more efficient way.

According to a first aspect of the fourth proposed solution, there is provided a method implemented at a terminal device. The method comprises obtaining measurement information based at least in part on configurations of a MN and a SN. The terminal device is connected to the MN and the SN. The method further comprises transmitting a report including the measurement information that comprises frequency information to the MN, in response to a failure related to the SN.

According to a second aspect of the fourth proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the first aspect of the fourth proposed solution.

According to a third aspect of the fourth proposed solution, there is provided a computer-readable medium having computer program codes embodied thereon which, when executed on a computer, cause the computer to perform any step of the method according to the first aspect of the fourth proposed solution.

According to a fourth aspect of the fourth proposed solution, there is provided an apparatus. The apparatus comprises an obtaining unit and a transmitting unit. In accordance with some exemplary embodiments, the obtaining unit may be operable to carry out at least the obtaining step of the method according to the first aspect of the fourth proposed solution. The transmitting unit may be operable to carry out at least the transmitting step of the method according to the first aspect of the fourth proposed solution.

According to a fifth aspect of the fourth proposed solution, there is provided a method implemented at a network node. The method comprises receiving a report including measurement information that comprises frequency information from a terminal device which is connected at least to the network node, in response to a failure related to another network node. The network node is configured to operate as a MN for the terminal device, and the another network node is configured to operate as a SN for the terminal device. The measurement information is based at least in part on configurations of the MN and the SN. The method further comprises interpreting the measurement information.

In accordance with some exemplary embodiments, the method according to the fifth aspect of the fourth proposed solution may further comprise determining another SN for the terminal device, based at least in part on the measurement information, and transmitting at least part of the measurement information to the another SN.

According to a sixth aspect of the fourth proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the fifth aspect of the fourth proposed solution.

According to a seventh aspect of the fourth proposed solution, there is provided a computer-readable medium having computer program codes embodied thereon which, when executed on a computer, cause the computer to perform any step of the method according to the fifth aspect of the fourth proposed solution.

According to an eighth aspect of the fourth proposed solution, there is provided an apparatus. The apparatus comprises a receiving unit and an interpreting unit. In accordance with some exemplary embodiments, the receiving unit may be operable to carry out at least the receiving step of the method according to the fifth aspect of the fourth proposed solution. The interpreting unit may be operable to carry out at least the interpreting step of the method according to the fifth aspect of the fourth proposed solution.

According to a ninth aspect of the fourth proposed solution, there is provided a method implemented at a network node. The method comprises receiving report including measurement information that comprises frequency information for a terminal device from another network node which is connected to the terminal device. The network node is configured to operate as a SN for the terminal device, and the another network node is configured to operate as a MN for the terminal device. The measurement information is based at least in part on configurations of the MN and another SN for the terminal device. The method further comprises interpreting the measurement information.

According to a tenth aspect of the fourth proposed solution, there is provided an apparatus. The apparatus comprises one or more processors and one or more memories comprising computer program codes. The one or more memories and the computer program codes may be configured to, with the one or more processors, cause the apparatus at least to perform any step of the method according to the ninth aspect of the fourth proposed solution.

According to an eleventh aspect of the fourth proposed solution, there is provided a computer-readable medium having computer program codes embodied thereon which, when executed on a computer, cause the computer to perform any step of the method according to the ninth aspect of the fourth proposed solution.

According to a twelfth aspect of the fourth proposed solution, there is provided an apparatus. The apparatus comprises a receiving unit and an interpreting unit. In accordance with some exemplary embodiments, the receiving unit may be operable to carry out at least the receiving step of the method according to the ninth aspect of the fourth proposed solution. The interpreting unit may be operable to carry out at least the interpreting step of the method according to the ninth aspect of the fourth proposed solution.

In accordance with some exemplary embodiments, the frequency information may comprise information about at least one of a frequency location of a synchronization signal and a frequency location of a reference signal.

In accordance with some exemplary embodiments, the frequency location of the synchronization signal may comprise a frequency location where a synchronization signal block is transmitted.

In accordance with some exemplary embodiments, the frequency information may further comprise an offset of the synchronization signal block.

In accordance with some exemplary embodiments, the information about the frequency location of the reference signal may comprise a reference location from which a channel state information-reference signal (CSI-RS) frequency location is derivable.

In accordance with some exemplary embodiments, the frequency information may comprise at least one absolute radio frequency channel number.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
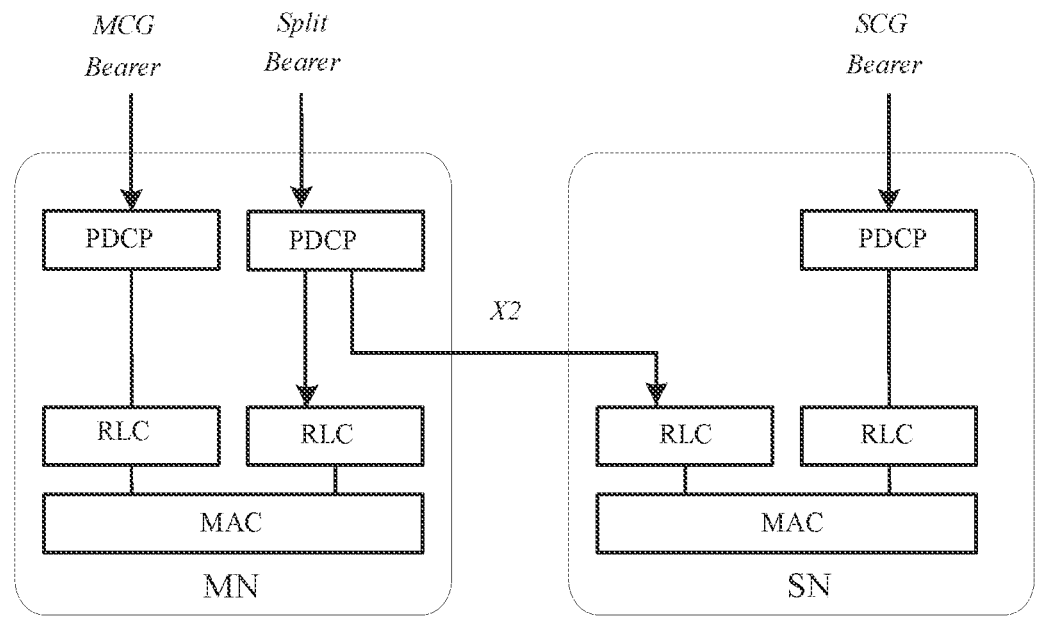
FIG. 1 is a diagram illustrating an exemplary user plane (UP) architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on system capacity and data rates, one interesting option for communication technique development is to support DC operations in a wireless communication network.

For example, an evolved universal mobile telecommunications system (UMTS) terrestrial radio access network (E-UTRAN) can support DC operations, so that a multiple transmitter/receiver (Tx/Rx) UE in a radio resource control connected state (RRC_CONNECTED) may be configured to utilize radio resources provided by two distinct schedulers, for example, located in two eNBs (such as radio base stations) connected via a non-ideal backhaul over the X2 interface. The non-ideal backhaul implies that the transport of messages over the X2 interface between nodes may be subject to both packet delays and losses.

In general, eNBs involved in DC for a certain UE may assume two different roles: an eNB may either act as a master node (MN), also referred to as master eNB (MeNB), or act as a secondary node (SN), also referred to as secondary eNB (SeNB). According to a LTE DC solution, a UE may be connected to a MN and a SN. Accordingly, an eNB can act both as an MN and an SN at the same time, for different UEs.

FIG. 1 is a diagram illustrating an exemplary UP architecture according to an embodiment of the present disclosure. The exemplary UP architecture shown in FIG. 1 may be applicable to a LTE DC scenario. Three types of radio protocol layers are shown for a MN and a SN, comprising a packet data convergence protocol (PDCP) layer, a radio link control (RLC) layer and a medium access control (MAC) layer. A radio protocol architecture which is used by a particular bearer may depend on how the bearer is setup.

As shown in FIG. 1, three bearer types may exist: a master cell group (MCG) bearer, a secondary cell group (SCG) bearer and a split bearer. The term "group" is used since a MN and a SN can use carrier aggregation (CA) to configure multiple cells for both the MN and the SN. In the LTE infrastructure, the RRC is located in a MN and signaling radio bearers (SRBs) are always configured as MCG bearer type and therefore only use radio resources of the MN. When an eNB acts as a SN for a UE, the eNB in the LTE DC scenario may not have any RRC context of that UE and all such signaling are handled by a MN for the UE.

The UE may have a corresponding protocol architecture where the UE is able to send and receive RRC messages over SRBs towards the MN, whereas data traffic over data radio bearers (DRBs) can be carried over the allocated radio resources to the MN/SN or from the MN/SN.

Figure 2:
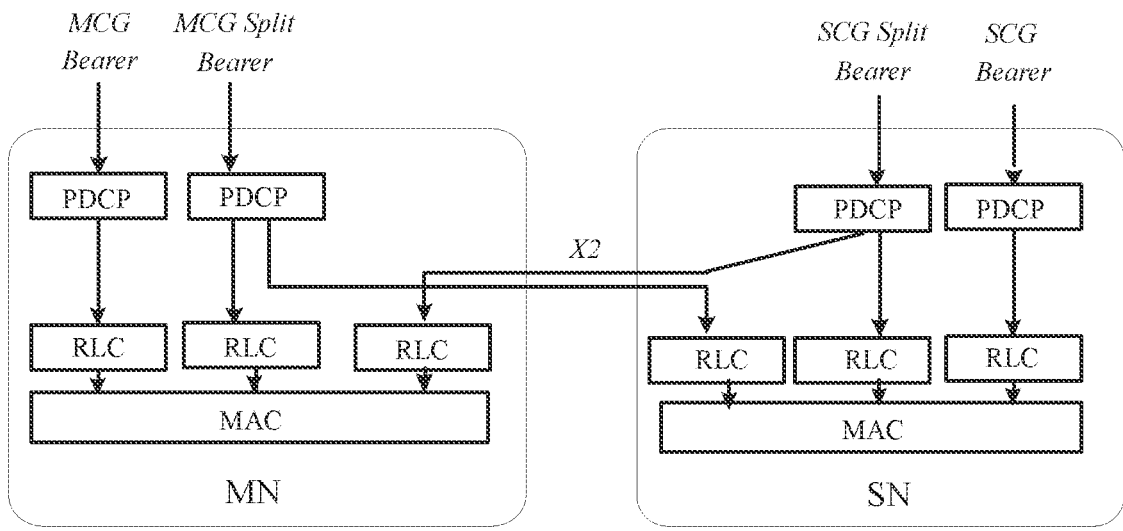
FIG. 2 is a diagram illustrating another exemplary UP architecture according to an embodiment of the present disclosure.

FIG. 2 is a diagram illustrating another exemplary UP architecture according to an embodiment of the present disclosure. The exemplary UP architecture shown in FIG. 2 may be applicable to a LTE-NR DC (also referred to as LTE-NR tight interworking) scenario or a NR DC scenario. Compared with the LTE DC scenario, in the scenario shown in FIG. 2, the split bearer from a SN is introduced as SCG split bearer, in addition to the split bearer from a MN (which is shown as MCG split bearer in FIG. 2). The SN in this particular case may be also referred to as secondary gNB (SgNB).

Figure 3:
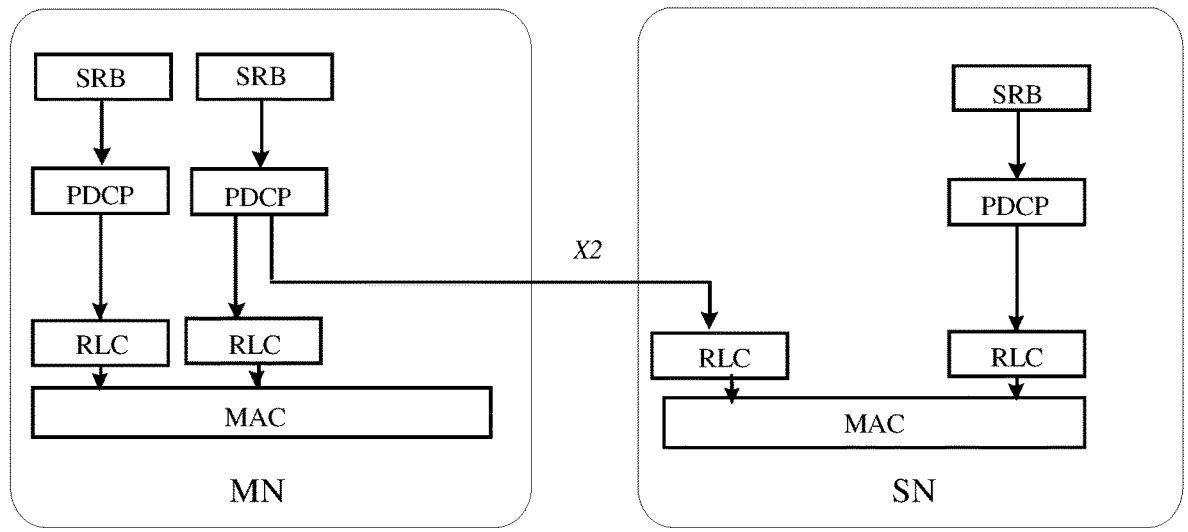
FIG. 3 is a diagram illustrating an exemplary control plane (CP) architecture according to an embodiment of the present disclosure.

FIG. 3 is a diagram illustrating an exemplary CP architecture according to an embodiment of the present disclosure. The exemplary CP architecture shown in FIG. 3 may be applicable to a NR/5G DC scenario. Compared with the LTE DC scenario, in the scenario shown in FIG. 3, SRB may not always be configured as MCG bearer type and the split bearer for RRC is introduced as split SRB for a MN and a SN. In addition, a direct RRC from the SN is introduced as SCG SRB or direct SRB.

From FIG. 2 and FIG. 3, it can be seen that separate SRBs are supported both from the MN and the SN. This means that a UE can receive signaling messages, such as RRC messages both from the MN and the SN. Thus, there may be two RRC instances responsible for controlling the UE, one directed from the MN and another from the SN. In this circumstance, the UE needs to terminate RRC signaling from two instances.

The motivation for introducing such multiple RRC instances in NR DC, and in particular for LTE-NR DC, is that the MN and the SN may partly be autonomously responsible for the control of radio resources. For example, the MN may allocate resources from some spectrum using LTE, while the SN may be responsible for configuring and allocating resources from some other spectrum which uses NR. As challenges for allocating resources in LTE and NR may differ substantially (for example, since NR might be allocated in a spectrum where beam-forming is highly desirable, while LTE might be allocated in a spectrum with good coverage but with very congested resources), it is important that the SN has some level of autonomy to configure and manage the UE on resources associated with the SN. On the other hand, the overall responsibility for connectivity to the UE would likely be at the MN, so the MN may have the overall responsibility, for example, for mobility, state changes of the UE, and for meeting quality of service demands of the UE, etc.

The MN and the SN may be network nodes that use LTE (4G) or NR (5G) radio access technologies. They may both support the same technology, or they may support different technologies. In an exemplary scenario, the MN uses LTE and is connected to the evolved packet core (EPC), while the SN uses NR and is not connected directly to the core-network. All traffics to/from the UE are carried via the MN from/to the EPC. This scenario is also known as non-stand-alone NR. It will be appreciated that there may be other scenarios where the MN and the SN may apply or support various radio interface technologies. For example, the MN may support LTE or NR, while the SN may support LTE or NR. Other technologies could also be used over the radio interface.

Figure 4:
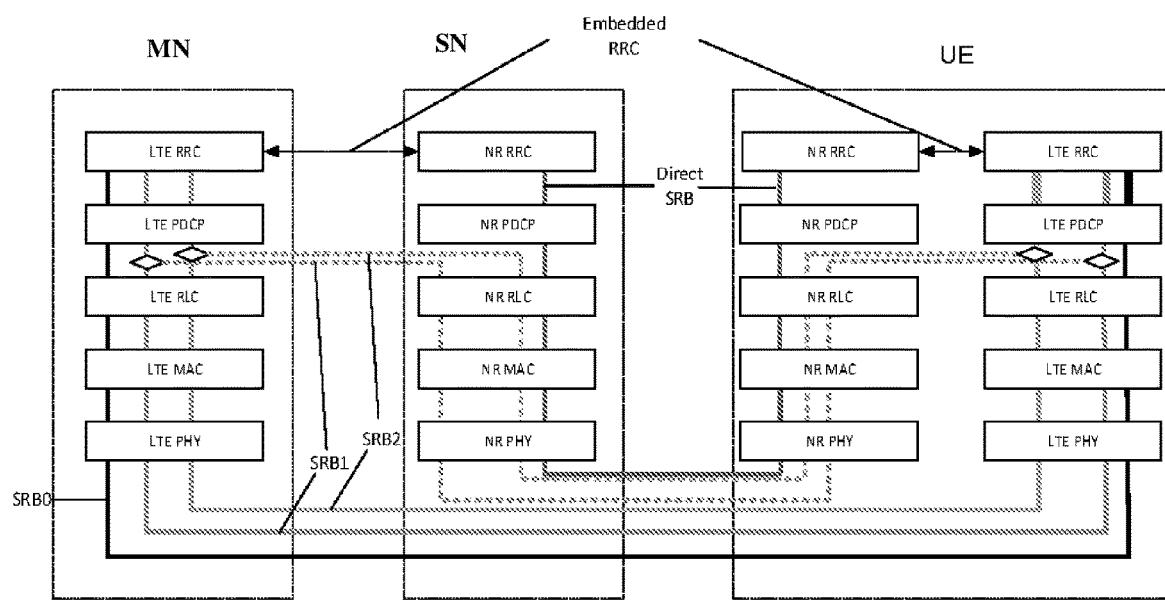
FIG. 4 is a diagram illustrating another exemplary CP architecture according to an embodiment of the present disclosure.

FIG. 4 is a diagram illustrating another exemplary CP architecture according to an embodiment of the present disclosure. In this embodiment of LTE-NR tight interworking, a UE is connected to multiple network nodes, e.g. a MeNB supporting LTE and a SgNB supporting NR (which are shown as MN and SN respectively in FIG. 4). The MeNB and the SgNB may respectively have a level of autonomy for configuring and controlling the UE with regards to its radio resources, which may be reflected by the support of multiple RRC instances. The configuring and controlling can take place using a signaling protocol such as a RRC protocol. Alternatively, the configuring and controlling could be implemented, for example, using a MAC protocol.

In FIG. 4, the protocols of the MeNB and the SgNB both terminate the RRC protocols of LTE and NR, respectively. As can be seen, the UE therefore terminates both an LTE RRC and an NR RRC protocol instance. Other protocol instances such as PDCP, RLC, MAC, physical (PHY) layer protocol instances are also schematically shown in FIG. 4. On the other hand, a control signaling mechanism (in addition to the direct SRB and split SRBs) using embedded RRC in the LTE-NR tight interworking is also illustrated in FIG. 4. The embedded RRC may be employed when the direct SRB is not available and the SgNB has to configure the UE that affects only the NR leg.

For example, the SgNB may send the RRC message to the MeNB via the X2 interface, which the MeNB then embeds in its own RRC message and sends via SRB1 (which could be a split SRB or MCG SRB). The UE will then be able to extract the embedded NR RRC message from the container MeNB RRC message and apply the configurations on the NR leg. In the uplink (UL) direction, the UE may embed the NR RRC messages in an LTE RRC message towards the MeNB, and the MeNB can extract the embedded NR RRC message from this LTE RRC message and forward it to the SgNB.

In a network scenario supporting DC, a SCG failure may be triggered for a number of reasons, for example, when the UE fails to maintain a connection to the SN (such as a connection via the cells of the SN) in which case the UE monitors the link quality for the primary secondary cell (PSCell) of the SCG. Alternatively, a SCG failure may be triggered by a failure of a change of SCG. One or more procedures for initiating and executing SCG failure recovery may be performed in response to a SCG failure.

Through a SCG failure recovery procedure, the network may be notified that the connection to the SN is malfunctioning or broken. This may be achieved by sending a SCGFailureInformation message to provide SCG radio link failure information from the UE to the MN. Then the MN can try, for example, to recover or re-establish a new SCG via the previous SN, or through a different SN. For example, the MN may need to assign a new PSCell.

For example, the SCGFailureInformation message may be a LTE RRC message that contains various pieces of information of relevance for controlling the connection to the UE, including measurement results as configured by the MN. The message also may include a cause flag carrying information about the reason for triggering the message.

According to an exemplary embodiment of LTE RRC, the measurement results included in the SCGFailureInformation message may contain two categories of measurement results:
  measResultServFreqList, which comprise measurement results of serving frequencies; and
  measResultNeighCells, which comprise measurement results of non-serving frequencies.

For measurement results reported in measResultServFreqList, the information which can be reported for each serving frequency may comprise:
  a UE-specific index of a serving cell (which may be assigned by the network via dedicated signaling), and reference signal receiving power/reference signal receiving quality (RSRP/RSRQ) for the serving cell; and
  a physical cell identifier (PCI) and RSRP/RSRQ for the best neighbor of the serving cell on the same frequency.

For measurement results reported in measResultNeighCells, the information which can be reported for each non-serving frequency may comprise:
  the carrier frequency; and
  a PCI and RSRP/RSRQ for each cell in the best measured cells on that frequency.

In accordance with an exemplary embodiment, the best measured cell may comprise a cell which is measured or detected with the best link quality. Alternatively or additionally, the best measured cell may comprise other suitable cell determined according to a predefined measurement evaluation criterion.

In an exemplary SCG failure case, the UE can maintain the current measurement configurations from both the MN and the SN (for example, the UE would not take autonomous action) and the UE may continue measurements based on the configuration from the MN. According to an exemplary embodiment, the UE may include in the SCGFailureInformation message the measurement results available according to current measurement configurations of both the MN and the SN. It may be advantageous that the MN can handle the SCGFailureInformation and then decide to keep, change or release the SN/SCG. Correspondingly, the measurement results according to the SN configuration can be forwarded to the old SN and/or to a new SN. It may also be desirable that the new SN can interpret the measurement results based on the configuration from the old SN.

In the LTE DC scenario, since all configurations (including CA/DC related) are coming from the MN, the MN is able to interpret all reported information including the association between cells, carriers and measurements. In the LTE-NR DC scenario, on the other hand, the SN also has the capability to configure the measurement results by itself. Thus the MN or another new SN may not be able to understand the measurement results according to the configuration from the old SN, especially if some identifiers are only locally unique. For example, a serving cell index of a SCell that was configured by the SN may be the same as that used by the MN. Also, even if there is no serving cell index confusion, the MN may not be able to know which frequency a reported cell in the measResultServFreqList is associated with. In the LTE DC case, since it is the MN that is responsible for configuration, it can keep a mapping of the frequency used by the SCells (whether they belong to the SCG or the MCG) with the serving cell index. However, the PCI included in the best neighbor information of a serving cell could not be used to identify the frequency, because the same PCI may be used by two cells operating on different frequencies.

Therefore, it may be desirable to introduce an effective solution to enable a MN and optionally a new SN to interpret measurement results based on the configuration from the old SN. In the first proposed solution according to some exemplary embodiments, a UE may include, in a report (such as a SCG failure message) sent to a MN, some information enabling the MN (or a potentially new SN) to interpret/understand measurement results and potentially act upon receiving the report. For example, the information included in the report may indicate the association between the SN associated cells and/or frequency and the measurement results. In this way, it may be identified where the failure has occurred, thereby solving any potential ambiguity.

The first proposed solution in the present disclosure may be applicable to a network context where a UE supporting DC may be connected to two network nodes such as MN and SN. Thus the UE may be configured by two separate control entities (such as RRC termination points) to perform measurements for radio resource managements. Separate reports of measurement results may be sent to the MN and the SN, respectively. In an exemplary embodiment, the MN may use the LTE technology, and the SN may use the NR technology.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not naturally limit the present disclosure in any way. Rather, any other system configuration or radio technologies may equally be utilized as long as exemplary embodiments described herein are applicable.

According to an exemplary embodiment, the UE may undergo a failure towards the SN (such as a SCG failure). There may be different causes for the failure, such as detected bad radio connectivity to the PSCell towards the SN. Triggered by the failure, and through a recovery procedure, the UE can inform the MN of the SCG failure, for example, by sending a SCG failure message to the MN. The SCG failure message may comprise measurement information. For instance, the measurement information may comprise measurement results configured both by the MN RRC and the SN RRC.

According to an exemplary embodiment, the measurement results associated with the SN serving frequencies can be either treated as serving frequency or non-serving frequency from the UE perspective when sending the SCG failure message such as a SCGFailureInformation message. In an exemplary embodiment where the SN serving frequencies are treated as non-serving frequencies by the UE, frequency information associated with the measurements results can be naturally included in the SCG failure message, as described with respect to measResultNeighCells in LTE RRC. With the additional frequency information such as frequency position and carrier number, the MN and optionally the new SN can understand the measurement results according to the configuration from the old SN.

In another exemplary embodiment where the SN serving frequencies are treated as serving frequencies by the UE, there may be three alternative schemes. In scheme I, frequency information also may be reported for measurement results of each serving frequency configured by the SN. In scheme II, measurement results of serving frequencies may be reported in two separate parts or lists, such as a list of measurement results of MN configured serving frequencies, and another list of measurement results of SN configured serving frequencies. In this way, there is no need for the MN and the SN to perform coordination about how to allocate serving cell indexes, since the MN can distinguish the measurement results of SN serving frequencies from the measurement results of MN serving frequencies although no frequency information of SN serving frequencies is reported. In scheme III, the MN and the SN may perform coordination about how to allocate serving cell indexes, so that the same cell index cannot be used by the MN and the SN. As such, measurement results of serving frequencies may be reported as in legacy LTE.

For schemes II and III, the MN may not be able to interpret the measurement results based on the configuration from the SN, as the MN does not know the frequency information associated with those measurement results. However, the MN could recognize the measurement results based on the configuration from SN, for example, by either the different lists of measurement results as set by the UE in scheme II, or the globally unique serving cell index as coordinated by the MN and SN in scheme III. In this regard, the MN may ask the SN to inform it the mapping from the serving cell index to the SN configured frequency.

By applying the first proposed solution in the present disclosure, performance of a communication network supporting DC, such as LTE-NR DC, may be significantly improved, as the MN and potentially new SN can understand all the measurement results included in a report such as the SCGFailureInformation message from the UE. Then the MN and/or the new SN can reconfigure the UE to connect to the network appropriately. Otherwise, new measurement configuration and new measurement may be required between the UE and the network, which may delay the procedure to recover from a SCG failure.

Figure 5A:
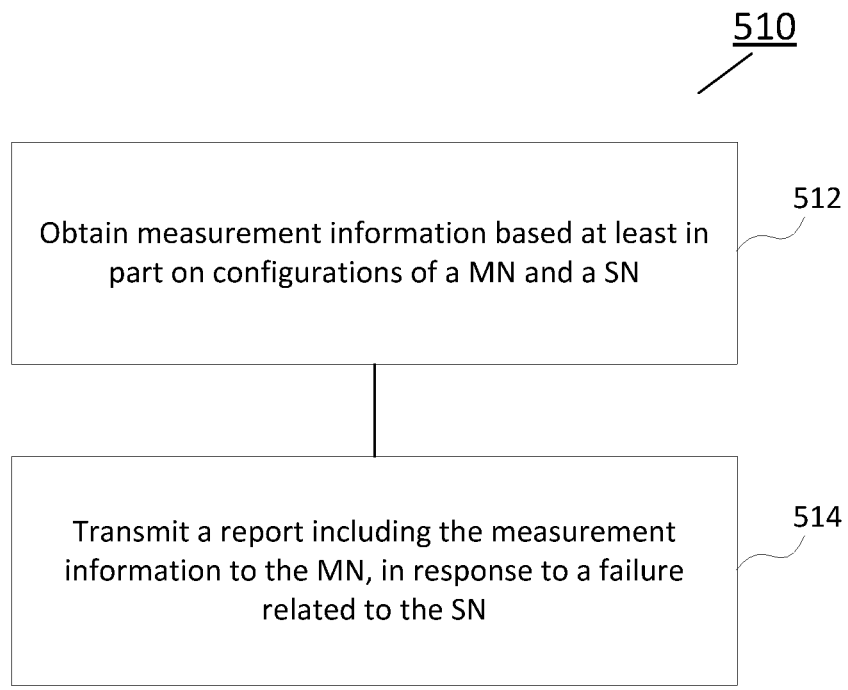
FIG. 5A is a flowchart illustrating a method according to some embodiments of the present disclosure.

FIG. 5A is a flowchart illustrating a method 510 according to some embodiments of the present disclosure. The method 510 illustrated in FIG. 5A may be performed by an apparatus implemented at a terminal device or communicatively coupled to a terminal device. In accordance with an exemplary embodiment, the terminal device may be served by a communication system supporting DC, for example, a LTE-NR tight interworking system where a LTE network node is a MN for the UE and a NR network node is a SN for the UE (also referred to as EN-DC), a LTE-NR DC system where a NR network node is a MN for the UE and a LTE network node is a SN for the UE (also referred to as NE-DC), a NR-NR DC system where both MN and SN are NR network nodes, or any other suitable system supporting DC.

According to the exemplary method 510 illustrated in FIG. 5A, the terminal device may be connected to a MN and a SN. The terminal device can obtain measurement information based at least in part on configurations of the MN and the SN, as shown in block 512. For example, the measurement information may comprise measurement results associated with serving frequencies configured by the MN and the SN.

In accordance with an exemplary embodiment, both MN and SN can configure the UE, for example, by specifying what to measure, how to measure and how to report. When there is no radio link failure, the measurement results according to the configuration of the MN may be sent to the MN, and the measurement results according to the configuration of the SN may be sent to the SN. However, a failure related to the SN may occur due to various reasons. In response to a failure related to the SN, the terminal device may transmit a report including the measurement information to the MN, as shown in block 514. For example, when there is a radio link failure such as a SCG failure, the UE may send to the MN a SCGFailureInformation message which includes the available measurement results according to the configurations of both MN and SN.

Figure 5B:
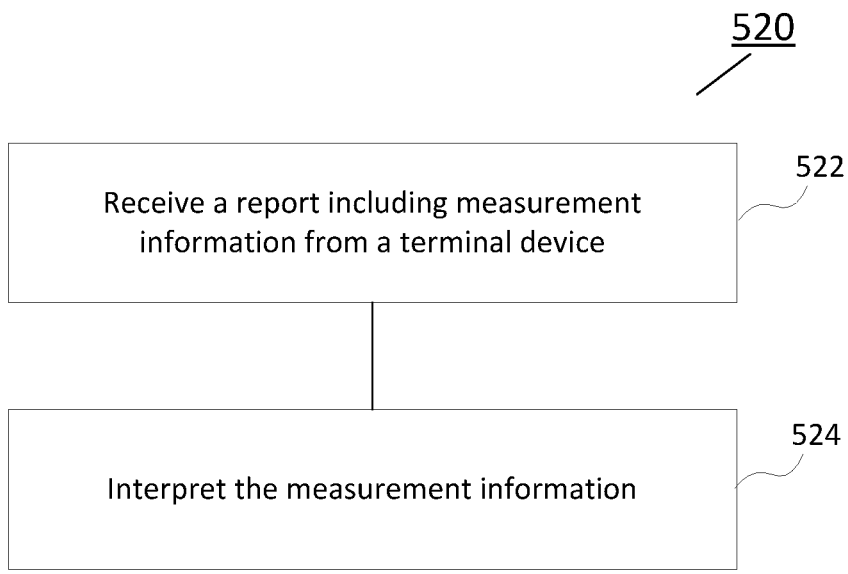
FIG. 5B is a flowchart illustrating a method according to some embodiments of the present disclosure.

FIG. 5B is a flowchart illustrating a method 520 according to some embodiments of the present disclosure. The method 520 illustrated in FIG. 5B may be performed by an apparatus implemented at a network node or communicatively coupled to a network node. In accordance with an exemplary embodiment, the network node may comprise a MN supporting LTE, 5G NR or other proper radio technologies, such as a master eNB (MeNB) or a master gNB (MgNB).

Corresponding to operations of the exemplary method 510 as illustrated in FIG. 5A, the MN in the exemplary method 520 receives a report including measurement information from a terminal device, as shown in block 522. The terminal device may be connected to the MN in a first network and a SN in a second network. The measurement information is based at least in part on configurations of the MN and the SN. In an exemplary embodiment, the first network may comprise a LTE network, and the second network may comprise a NR network. Alternatively, the first network may comprise a NR network, and the second network may comprise a LTE network or a NR network. It will be appreciated that other suitable radio access technologies also may be applied when performing the exemplary methods.

In block 524, the MN can interpret the measurement information. For example, the MN can extract measurement results associated with serving frequencies configured by the MN and the SN. According to an exemplary embodiment, the measurement information may be interpreted for enabling a reconfiguration procedure for the terminal device. For example, the reconfiguration procedure may comprise: determining another SN for the terminal device, based at least in part on the measurement information, and transmitting at least part of the measurement results associated with the serving frequencies configured by the SN to the another SN.

In accordance with an exemplary embodiment, the report transmitted from the terminal device to the MN may comprise a failure message (such as a SCGFailureInformation message or other suitable signaling message) for informing the MN of a failure related to the SN.

In accordance with an exemplary embodiment, the report may indicate an association between a serving frequency configured by the SN and a measurement result associated with the serving frequency. For example, the association may be indicated by an indication of the serving frequency configured by the SN. Alternatively, the association may be indicated by an index of a serving cell on the serving frequency configured by the SN, where the index of the serving cell may have a mapping relationship with the serving frequency.

According to an exemplary embodiment where the association is indicated by the indication of the serving frequency configured by the SN, the UE may treat the serving frequency configured by the SN (for example, all the frequencies used by the SCG cells) as the non-serving frequency. In this way, the UE may include frequency information of the serving frequency or carrier configured by the SN in the report transmitted to the MN. For example, the frequency information may comprise an exact frequency position (for example, within a carrier frequency) where one or more resource blocks are transmitted. The frequency position could either be at the center of a carrier or in a different frequency position shifted from the center. Alternatively or additionally, the frequency information may comprise some carrier information, for example, a carrier number (such as a value of the absolute radio frequency channel number (ARFCN)) and an additional frequency shift.

In the case where the serving frequency configured by the SN is treated as the non-serving frequency, the measurement result associated with the serving frequency configured by the SN may comprise: an identifier (such as PCI) of a best measured cell on the serving frequency, and an indication of reference signal quality (such as RSRP/RSRQ) for the best measured cell. With these information included in the report, the MN may be able to interpret the received measurement results, regardless of whether the measurement results are associated with the MN or the SN. The report of the measurement results may comprise a SCGFailureInformation message of which the structure may not need to be changed.

It is noted that there may be some loss of information in this case compared with the case where the serving frequency configured by the SN is treated as the serving frequency. For the serving frequency, the UE may include the PSCell and SCell frequencies in the serving frequency part of a measurement report, and also include measurement results of the best neighbor for each cell. However, when treating the PSCell and SCell frequencies as the non-serving frequency part of the measurement report, only the information about the best measured cell on each frequency may be included in the report.

In view of this, it may be possible to modify the SCGFailureInformation message so that the serving cells of the SCG is included in the non-serving frequency part while the additional neighbor information also may be included just like the way as in the serving frequency part. According to an exemplary embodiment, in addition to the identifier (such as PCI) of a best measured cell on the serving frequency and the indication of reference signal quality (such as RSRP/RSRQ) for the best measured cell, the measurement result associated with the serving frequency configured by the SN may further comprise an identifier (such as PCI) of a best neighbor of the best measured cell, and an indication of reference signal quality (such as RSRP/RSRQ) for the best neighbor.

According to the exemplary embodiment where the association is indicated by the indication of the serving frequency configured by the SN, the UE also may treat the serving frequency configured by the SN as the serving frequency. In this case, the UE may further include some frequency information associated with the serving frequency in the report of measurement results, in order to enable other nodes (such as the MN or a new SN to which the UE may be reconfigured) different from the previously failed SN to interpret these measurement results and/or failure related information (and possible take actions upon the reception of the report).

For the case where the serving frequency configured by the SN is treated as the serving frequency, the measurement result associated with the serving frequency configured by the SN may comprise: an index of a serving cell on the serving frequency, an indication of reference signal quality (such as RSRP/RSRQ) for the serving cell, an identifier (such as PCI) of a best neighbor of the serving cell, and an indication of reference signal quality (such as RSRP/RSRQ) for the best neighbor.

In accordance with an exemplary embodiment, in order to make the MN (and optionally the new SN where the measurement results may be later forwarded to) be able to interpret the measurement results even they are based on the configuration from the old SN, the structure of the measurement report such as a SCGFailureInformation message may require enhancements to include the frequency information associated with the serving frequency configured by the SN. For example, a new SCGFailureInformation message may be designed as below by adding a field to indicate the frequency information of the SN configured serving frequency, as shown below.

It is noted that the frequency information field may be an optional field because the frequency information may not be needed for the serving cells of the MCG as the MN is already aware of it. It will be realized that although the term "ARFCN-ValueEUTRA" is used here, other suitable term also may be used, which may depend on the involved radio techniques. For example, if the SN is associated with the NR, the reported frequency information may be related to the NR. Thus, the term such as "ARFCN-ValueNR" may be used for the frequency information field.

In an exemplary embodiment, the frequency information field may indicate a frequency position (for example, within a carrier frequency) where one or more radio resource blocks are transmitted. A possible parameter or value of the frequency information field may indicate the center of a carrier or a different frequency position shifted from the center. Optionally, the NR frequency information may comprise the carrier information (such as a carrier number represented by ARFCN-ValueNR) and an additional frequency shift. As such, the size of the report may be increased. However, it may not be an issue because, for example, the report is transmitted over the MN, which in principle still has a good link, and failure events are rare and thus may not occur constantly (for example, compared to ordinary measurement reports).

According to the exemplary embodiment where the association between the SN configured serving frequency and the measurement result is indicated by the index of the serving cell which has a mapping relationship with the serving frequency, the UE may treat the serving frequency configured by the SN as the serving frequency. Thus, there may be no need to report the interference information corresponding to the measurement results associated with the SN configured serving frequency to the MN. In this case, the measurement results associated with the serving frequencies configured by the MN may be separated in the report

```
SCGFailureInformation-r12-IEs ::=       SEQUENCE {
    failureReportSCG-r12                FailureReportSCG-r12        OPTIONAL,
    nonCriticalExtension                SEQUENCE { }                OPTIONAL
}
FailureReportSCG-r12 ::=                SEQUENCE {
    failureType-r12                     ENUMERATED {t313-Expiry, randomAccessProblem,
                                            rlc-MaxNumRetx, scg-ChangeFailure },
    measResultServFreqList-r12          MeasResultServFreqList-r10      OPTIONAL,
    measResultNeighCells-r12            MeasResultList2EUTRA-r9         OPTIONAL,
    ...,
    [[
    measResultServFreqListExt-r13       MeasResultServFreqListExt-r13       OPTIONAL
    ]]
}
MeasResultServFreqList-r10 ::=   SEQUENCE (SIZE (1..maxServCell-r10)) OF
MeasResultServFreq-r10
MeasResultServFreqListExt-r13 ::=       SEQUENCE (SIZE
(maxServCell-Plus1..maxServCell-r13)) OF MeasResultServFreq-r13
MeasResultServFreq-r10 ::=              SEQUENCE {
    servFreqId-r10                      ServCellIndex-r10,
    carrierFreq-r9                      ARFCN-ValueEUTRA            OPTIONAL,
    measResultSCell-r10                 SEQUENCE {
        rsrpResultSCell-r10                 RSRP-Range,
        rsrqResultSCell-r10                 RSRQ-Range
    }                                                               OPTIONAL,
    measResultBestNeighCell-r10         SEQUENCE {
        physCellId-r10                      PhysCellId,
        rsrpResultNCell-r10                 RSRP-Range,
        rsrqResultNCell-r10                 RSRQ-Range
    }                                                               OPTIONAL,
    ...,
    [[ measResultSCell-v1250            RSRQ-Range-v1250    OPTIONAL,
       measResultBestNeighCell-v1250    RSRQ-Range-v1250    OPTIONAL
    ]],
``` from the measurement results associated with the serving frequencies configured by the SN. Accordingly, the index of the serving cell may be allocated by the SN without coordination with the MN.

For example, a new SCGFailureInformation message may be designed as below by dividing the measurement results into two parts: one for the serving frequencies configured by the MN, and another for the serving frequencies configured by the SN, as shown below.

without requesting it from the SN purposely. For example, the addition and removal of SCells of the SCG, though to be decided by the SN, may have still to be coordinated with the MN because of the limitation of the total number of carriers that the UE can support. In addition, the UE may not support all possible band combinations between LTE and NR carriers. Thus the cell index to frequency mapping for the SCG cells can be implicitly gathered as part of such coordination process.

```
SCGFailureInformation-r12-IEs ::=    SEQUENCE {
    failureReportSCG-r12             FailureReportSCG-r12           OPTIONAL,
    nonCriticalExtension             SEQUENCE { }                   OPTIONAL
}
FailureReportSCG-r12 ::=    SEQUENCE {
    failureType-r12                  ENUMERATED {t313-Expiry, randomAccessProblem,
                                         rlc-MaxNumRetx, scg-ChangeFailure },
    measResultServFreqList-r12       MeasResultServFreqList-r10     OPTIONAL,
    measResultServFreqSCGList        MeasResultServFreqSCGList      OPTIONAL,
    measResultNeighCells-r12         MeasResultList2EUTRA-r9        OPTIONAL,
    ...,
    [[
    measResultServFreqListExt-r13    MeasResultServFreqListExt-r13
    OPTIONAL
    ]]
}
MeasResultServFreqList-r10 ::=    SEQUENCE (SIZE (1..maxServCell-r10)) OF
MeasResultServFreq-r10
MeasResultServFreqSCGList ::=    SEQUENCE (SIZE (1..maxServCell-r10)) OF
MeasResultServFreq-r10
MeasResultServFreqListExt-r13 ::=    SEQUENCE (SIZE
(maxServCell-Plus1..maxServCell-r13)) OF MeasResultServFreq-r13
MeasResultServFreq-r10 ::=           SEQUENCE {
    servFreqId-r10                   ServCellIndex-r10,
    measResultSCell-r10              SEQUENCE {
        rsrpResultSCell-r10              RSRP-Range,
        rsrqResultSCell-r10              RSRQ-Range
    }                                                               OPTIONAL,
    measResultBestNeighCell-r10      SEQUENCE {
        physCellId-r10                   PhysCellId,
        rsrpResultNCell-r10              RSRP-Range,
        rsrqResultNCell-r10              RSRQ-Range
    }                                                               OPTIONAL,
    ...,
    [[ measResultSCell-v1250            RSRQ-Range-v1250   OPTIONAL,
       measResultBestNeighCell-v1250    RSRQ-Range-v1250   OPTIONAL
    ]],
```

Similarly, the frequency information field may be an optional field because the frequency information may be not needed for the serving cells of the MCG as the MN is already aware of it. For the measurement results associated with the serving frequency configured by the SN, the MN (and optionally a new SN) may be able to distinguish them from the measurement results associated with the serving frequency configured by the MN, since the two types of measurement results are separable in the report.

Although the MN can recognize the measurement results associated with the SN, it may not be able to interpret them because these measurement results are based on the configuration from the SN. In this regard, the MN may request the SN, for example, through an existing and/or newly designed signaling, to inform it about information indicating the mapping from a serving cell index to a serving frequency. In this case, the size of the SCGFailureInformation message may not be increased, but a signaling communication between the MN and the SN may be needed to facilitate the mapping from the serving cell index to the serving frequency.

Alternatively or additionally, the MN may get from the SN some information indicating the mapping from a serving cell index to a serving frequency through other processes, According to the exemplary embodiment where the association between the SN configured serving frequency and the measurement result is indicated by the index of the serving cell which has a mapping relationship with the serving frequency, the index of the serving cell may be allocated by coordination of the MN and the SN. For example, the MN and the SN may coordinate the allocation of serving cell indexes to make sure the same serving cell index would not be used by both the MN and the SN. In this case, the index of the serving cell may be the globally unique index, and thus there may be no need to divide the measurement results into different parts in the report, even though no relevant frequency information is reported to the MN. In other words, the UE may treat the serving frequency configured by the SN as the serving frequency and report the measurement results just as in legacy LTE.

Through the globally unique cell index, the MN can recognize the measurement results associated with the SN, although it may not be able to interpret them because these measurement results are based on the configuration from the SN. In this case, the mapping relationship between the index of the serving cell and the serving frequency configured by the SN may be gathered by the MN from the SN. For example, the MN may request the SN to inform it about information indicating the mapping from a serving cell index to a serving frequency. Alternatively or additionally, the cell index to frequency mapping for the SCG cells can be implicitly gathered as part of one or more previous coordination processes between the MN and the SN.

In accordance with an exemplary embodiment, the measurement information obtained by the terminal device may further comprise measurement results associated with beams used by the MN and the SN. For example, the SCGFailureInformation message may be extended to include beam measurement results even though the high level structure of the SCGFailureInformation message may not be changed.

Figure 5C:
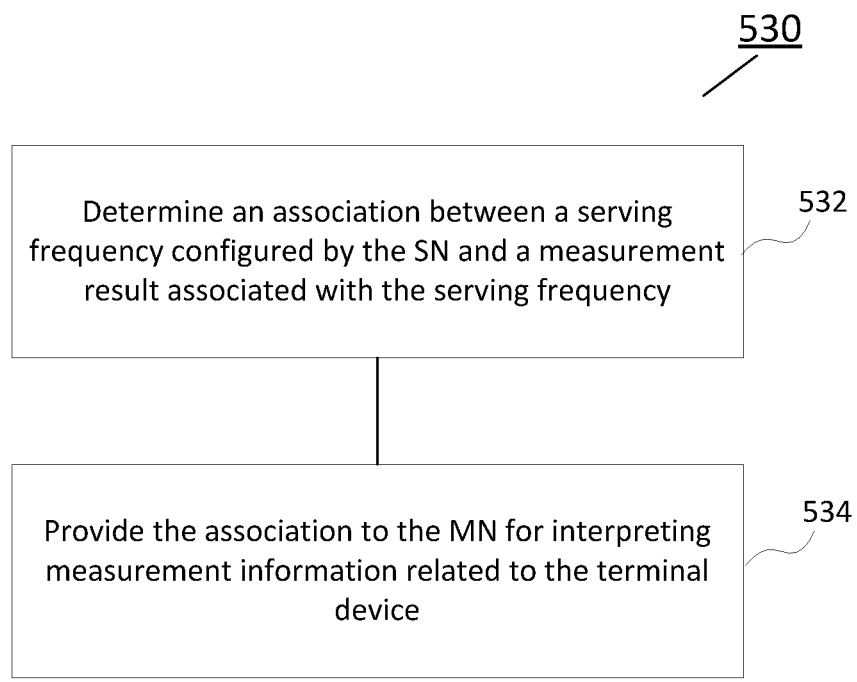
FIG. 5C is a flowchart illustrating a method according to some embodiments of the present disclosure.

FIG. 5C is a flowchart illustrating a method 530 according to some embodiments of the present disclosure. The method 530 illustrated in FIG. 5C may be performed by an apparatus implemented at a network node or communicatively coupled to a network node. In accordance with an exemplary embodiment, the network node may comprise a SN supporting LTE, 5G NR or other proper radio technologies, such as a secondary eNB (SeNB) or a secondary gNB (SgNB).

Corresponding to operations of the exemplary method 520 as illustrated in FIG. 5B, the SN in the exemplary method 530 determines an association between a serving frequency configured by the SN and a measurement result associated with the serving frequency, as shown in block 532. For example, the association may comprise a mapping relationship between the serving frequency configured by the SN and an index of a serving cell on the serving frequency. The serving frequency may be configured for a terminal device such as a UE which is connected to a MN and the SN.

In block 534, the SN provides the association to the MN for interpreting measurement information related to the terminal device. For example, the association may be provided as requested by the MN, or in a coordination process between the MN and the SN. As described previously, the measurement information may be based at least in part on configurations of the MN and the SN. Accordingly, the measurement information may comprise at least the measurement result associated with the serving frequency configured by the SN. Thus, the MN may be able to interpret the measurement information, for example, by utilizing the association between the SN configured serving frequency and the measurement result associated with the serving frequency.

The first proposed solution according to one or more exemplary embodiments can enable a MN to be able to understand the content of measurement information in a report from a UE. Taking the advantage of the first proposed solution makes it possible to use measurement results by the MN to determine another node, if any, as a new SN. If it is determined to designate another node as a new SN for the UE, the MN can then forward some relevant information extracted from the measurement information related to the old SN carriers/frequencies towards the new SN, so that the new SN could use it to choose the PSCell as well as the SCG SCells for the UE.

Figure 5D:
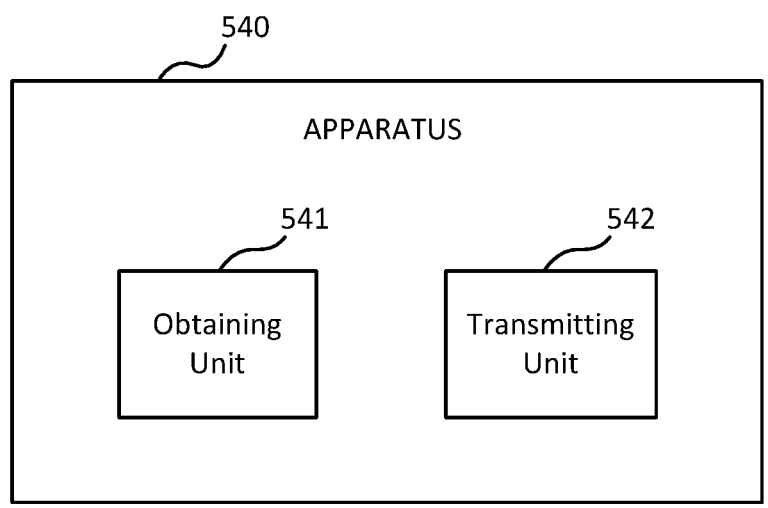
FIG. 5D is a block diagram illustrating an apparatus according to some embodiments of the present disclosure.

FIG. 5D is a block diagram illustrating an apparatus 540 according to some embodiments of the present disclosure. As shown in FIG. 5D, the apparatus 540 may comprise an obtaining unit 541 and a transmitting unit 542. In an exemplary embodiment, the apparatus 540 may be implemented at a terminal device such as a UE. The obtaining unit 541 may be operable to carry out the operation in block 512, and the transmitting unit 542 may be operable to carry out the operation in block 514. Optionally, the obtaining unit 541 and/or the transmitting unit 542 may be operable to carry out more or less operations to implement the proposed methods according to the exemplary embodiments of the present disclosure.

Figure 5E:
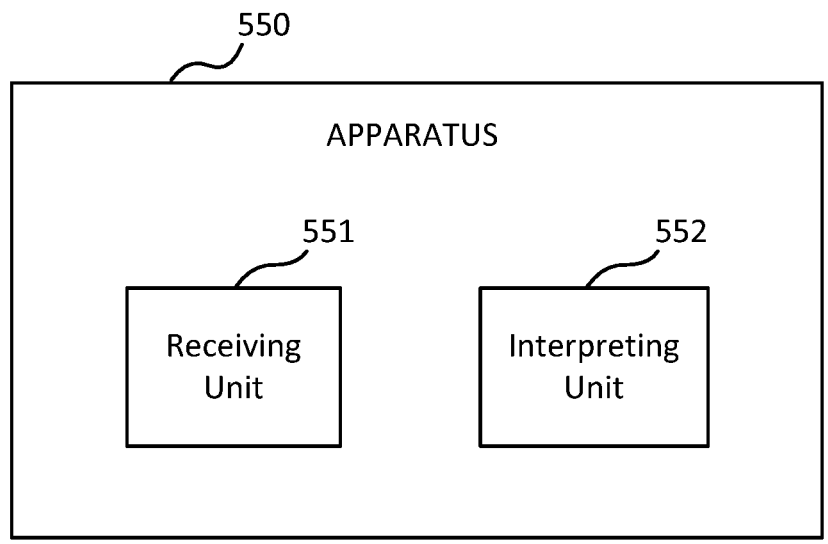
FIG. 5E is a block diagram illustrating an apparatus according to some embodiments of the present disclosure.

FIG. 5E is a block diagram illustrating an apparatus 550 according to some embodiments of the present disclosure. As shown in FIG. 5E, the apparatus 550 may comprise a receiving unit 551 and an interpreting unit 552. In an exemplary embodiment, the apparatus 550 may be implemented at a network node such as a MN. The receiving unit 551 may be operable to carry out the operation in block 522, and the interpreting unit 552 may be operable to carry out the operation in block 524. Optionally, the receiving unit 551 and/or the interpreting unit 552 may be operable to carry out more or less operations to implement the proposed methods according to the exemplary embodiments of the present disclosure.

Figure 5F:
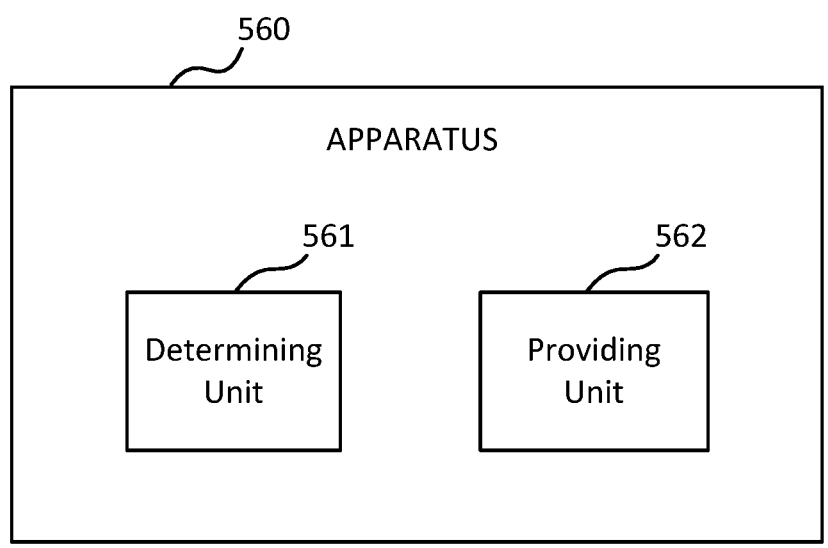
FIG. 5F is a block diagram illustrating an apparatus according to some embodiments of the present disclosure.

FIG. 5F is a block diagram illustrating an apparatus 560 according to some embodiments of the present disclosure. As shown in FIG. 5F, the apparatus 560 may comprise a determining unit 561 and a providing unit 562. In an exemplary embodiment, the apparatus 560 may be implemented at a network node such as a SN. The determining unit 561 may be operable to carry out the operation in block 532, and the providing unit 562 may be operable to carry out the operation in block 534. Optionally, the determining unit 561 and/or the providing unit 562 may be operable to carry out more or less operations to implement the proposed methods according to the exemplary embodiments of the present disclosure.

In a network scenario supporting DC, a MN may initiate a SN addition or SN change procedure for a UE. Thus, the UE may send to the MN some measurement information according to a measurement configuration based on the MN. When the MN gets the measurement information, it can decide which target SN to add in the case of SN addition or to change to in the case of SN change, and then forward relevant measurement information to the chosen target SN, so that the target SN can use the relevant measurement information to decide which cell would be the primary cell and which cells (if any) would be the secondary cells.

Similarly, a SN also may initiate a SN change procedure for a UE. Thus, the UE may send to the SN some measurement information according to a measurement configuration based on the SN. When the SN gets the measurement information, it can decide which new SN to change to, and then forward relevant measurement information to the chosen new SN via the MN, so that the new SN can use the relevant measurement information to decide which cell would be the primary cell and which cells (if any) would be the secondary cells.

In LTE DC, the communication of the measurement information may be performed via the SCG configuration information during a SN addition procedure. Some information such as ScellToAddModListSCG containing cell identifications of the secondary cells, for example, an index of a serving cell to frequency/physical cell identifier (PCI) mapping, also may be included in the SN addition procedure.

For the case of LTE-NR interworking, it may not be necessary to have ScellToAddModListSCG because it is up to the SN to decide the secondary cells to add. Thus the new SN may not be able to understand the measurement results according to the configuration from the MN or the old SN, especially if some identifiers are only locally unique. For example, a serving cell index of a SCell that was configured by the MN may be the same as that used by the new SN. Also, even if there is no serving cell index confusion, the new SN may not be able to know which frequency is associated with the measurement result. In the LTE DC case, since it is the MN that is responsible for configuration, it can keep a mapping of the frequency used by the SCells (whether they belong to the SCG or the MCG) with the serving cell index.

Therefore, it may be desirable to introduce an effective solution to enable the new SN to interpret measurement information based on the configuration from the MN or the old SN. In the second proposed solution according to some exemplary embodiments, a report including measurement information associated with the UE may be transmitted to the new SN. The report may indicate an association between the frequency/PCI information and the measurement results to enable the new SN to interpret/understand the reported measurement information. For example, the report may indicate additional frequency information such as frequency position and carrier number, thus the new SN can understand the measurement results according to the configuration from the MN and/or the old SN.

The second proposed solution in the present disclosure may be applicable to a network context where a UE may be connected to two network nodes such as a MN and a SN. For example, the UE may be configured by two separate control entities (such as RRC termination points) to perform measurements for radio resource managements. Separate reports of measurement results may be sent to the MN and the SN, respectively. In an exemplary embodiment, the MN may use the LTE technology, and the SN may use the NR technology.

By applying the second proposed solution in the present disclosure, performance of a communication network such as LTE-NR interworking network may be significantly improved, as the new SN can understand all the measurement results from the UE. Then the UE may be connected to the new SN appropriately.

Figure 6A:
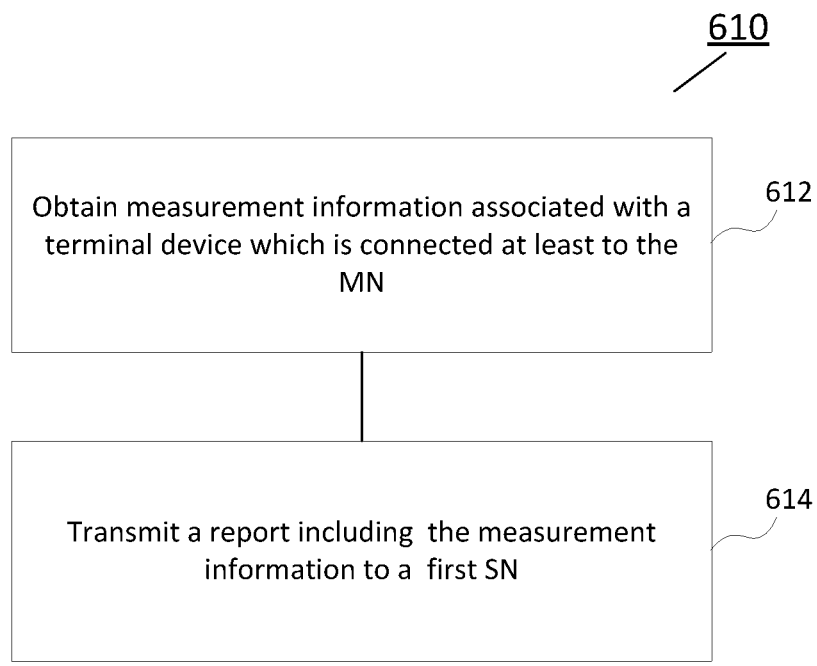
FIG. 6A is a flowchart illustrating a method according to some embodiments of the present disclosure.

FIG. 6A is a flowchart illustrating a method 610 according to some embodiments of the present disclosure. The method 610 illustrated in FIG. 6A may be performed by an apparatus implemented at a network node or communicatively coupled to a network node. In accordance with an exemplary embodiment, the network node may comprise a MN supporting LTE, 5G NR or other proper radio technologies, such as a master eNB (MeNB) or a master gNB (MgNB).

According to the exemplary method 610 illustrated in FIG. 6A, the MN can obtain measurement information associated with a terminal device which is connected at least to the MN, as shown in block 612. For example, the terminal device may be served by a communication system supporting DC, such as a LTE-NR tight interworking system where a LTE network node is a MN for the UE and optionally a NR network node is a SN for the UE (also referred to as EN-DC), a LTE-NR DC system where a NR network node is a MN for the UE and optionally a LTE network node is a SN for the UE (also referred to as NE-DC), a NR-NR DC system where the MN and optionally the SN are NR network nodes, or any other suitable system supporting DC.

In accordance with an exemplary embodiment, the MN can transmit a report including the measurement information to a first SN, as shown in block 614. The report may indicate frequency information associated with the measurement information.

In accordance with an exemplary embodiment, the transmission of the report may be in response to a determination of the first SN. In an exemplary embodiment, the MN may initiate the determination of the first SN. For example, the MN may initiate a SN addition procedure for the terminal device, so that the terminal device may be connected to the first SN determined by the MN.

In accordance with an exemplary embodiment, the terminal device may be connected to the MN and a second SN. The MN may initiate a SN change procedure for the terminal device, so that the terminal device may change to be connected to the first SN determined by the MN from the second SN.

In accordance with an exemplary embodiment where the determination of the first SN is initiated by the MN, the measurement information may be obtained from the terminal device. The measurement information may comprise a measurement result associated with a serving frequency configured by the MN.

Optionally, in the case that the terminal device is connected to the MN and the second SN, the second SN may initiate the determination of the first SN. For example, the second SN may initiate a SN change procedure for the terminal device, so that the terminal device may change to be connected to the first SN from the second SN.

In accordance with an exemplary embodiment where the determination of the first SN is initiated by the second SN, the measurement information may be obtained by the MN from the second SN. For example, the second SN can get the measurement information from the terminal device. Thus, the measurement information may comprise a measurement result associated with a serving frequency configured by the second SN. In this case, the operation of obtaining the measurement information associated with the terminal device as shown in block 612 may further comprise obtaining the frequency information associated with the measurement information from the second SN.

In accordance with an exemplary embodiment, the frequency information may comprise at least one of: an indication of a serving frequency and a physical cell identifier (PCI).

Figure 6B:
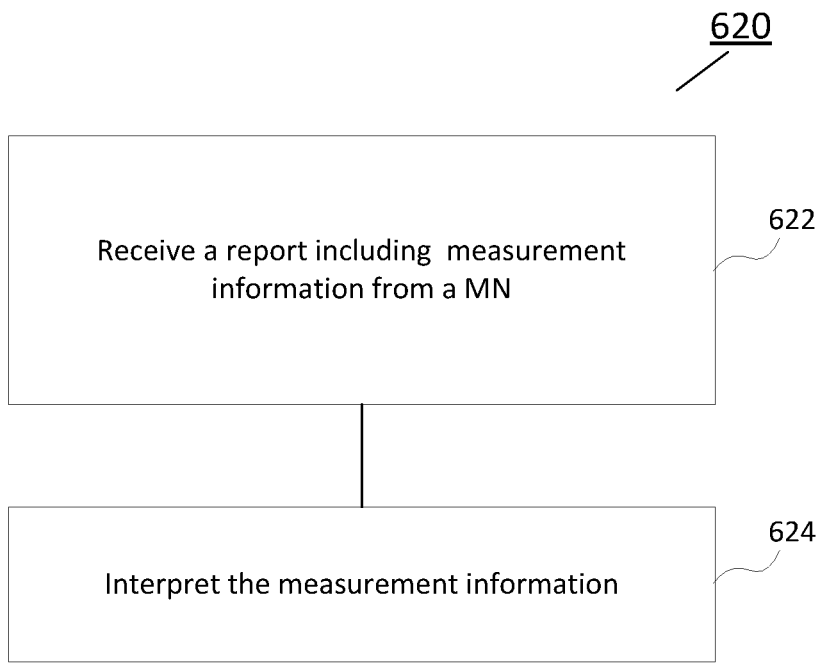
FIG. 6B is a flowchart illustrating a method according to some embodiments of the present disclosure.

FIG. 6B is a flowchart illustrating a method 620 according to some embodiments of the present disclosure. The method 620 illustrated in FIG. 6B may be performed by an apparatus implemented at a network node or communicatively coupled to a network node. In accordance with an exemplary embodiment, the network node may comprise a SN supporting LTE, 5G NR or other proper radio technologies, such as a secondary eNB (SeNB) or a secondary gNB (SgNB).

Corresponding to operations of the exemplary method 610 as illustrated in FIG. 6A, the SN in the exemplary method 620 may refer to the first SN which is determined by the MN or the second SN. As shown in block 622, the first SN may receive a report including measurement information from a MN. The measurement information may be associated with a terminal device which is connected at least to the MN. The report may indicate frequency information (for example, an indication of a serving frequency and/or a PCI) associated with the measurement information. Thus, the first SN can interpret the measurement information, as shown in block 624.

In accordance with an exemplary embodiment, the reception of the report may be in response to a determination of the first SN. Considering that the terminal device may be connected to the MN and optionally a second SN, the measurement information may comprise a measurement result associated with at least one of serving frequencies configured by the MN and the second SN. On the other hand, the determination of the first SN may be initiated by the MN or the second SN.

In accordance with an exemplary embodiment, the frequency information may comprise an exact frequency position (for example, within a carrier frequency) where one or more resource blocks are transmitted. The frequency position could either be at the center of a carrier or in a different frequency position shifted from the center. Alternatively or additionally, the frequency information may comprise some carrier information, for example, a carrier number (such as a value of the absolute radio frequency channel number (ARFCN)) and an additional frequency shift.

Figure 6C:
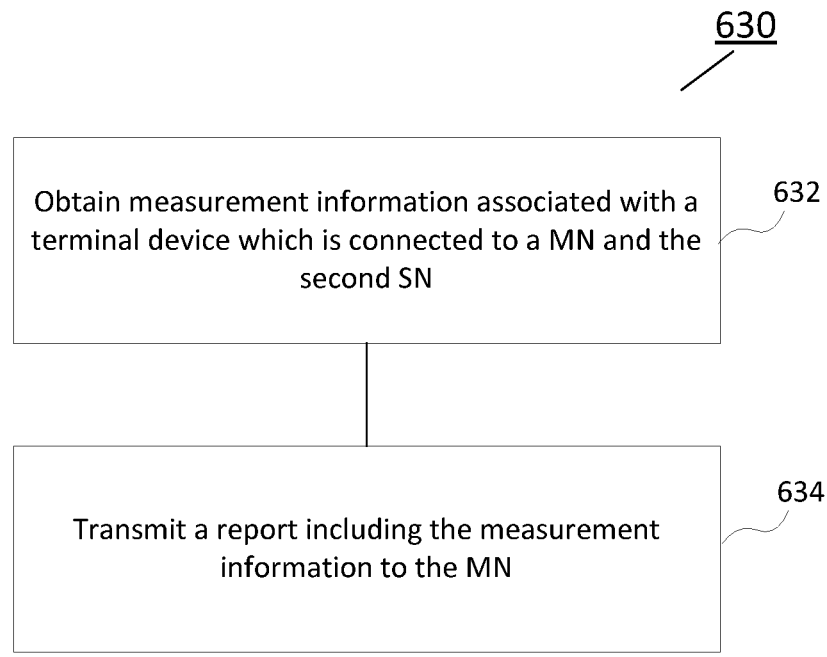
FIG. 6C is a flowchart illustrating a method according to some embodiments of the present disclosure.

FIG. 6C is a flowchart illustrating a method 630 according to some embodiments of the present disclosure. The method 630 illustrated in FIG. 6C may be performed by an apparatus implemented at a network node or communicatively coupled to a network node. In accordance with an exemplary embodiment, the network node may comprise a SN supporting LTE, 5G NR or other proper radio technologies, such as a secondary eNB (SeNB) or a secondary gNB (SgNB).

Corresponding to operations of the exemplary method 620 as illustrated in FIG. 6B, the SN in the exemplary method 630 may refer to the second SN to which the terminal device is connected. As shown in block 632, the second SN can obtain measurement information associated with a terminal device which is connected to a MN and the second SN. For example, the measurement information may be obtained from the terminal device and comprise a measurement result associated with a serving frequency configured by the second SN.

In accordance with an exemplary embodiment, the second SN may transmit a report including the measurement information to the MN, as shown in block 634. For example, the report may indicate frequency information associated with the measurement information.

In accordance with an exemplary embodiment, the transmission of the report may be in response to a determination of a first SN. For example, the determination of the first SN may be initiated by the second SN.

The second proposed solution according to one or more exemplary embodiments can enable a new SN to be able to understand the content of measurement information from a UE. Taking the advantage of the second proposed solution makes it possible to use measurement results by the new SN properly. If it is determined to designate a new SN for the UE, the MN can forward some relevant measurement information towards the new SN, so that the new SN could use it to choose the PSCell as well as the SCG SCells for the UE.

Figure 6D:
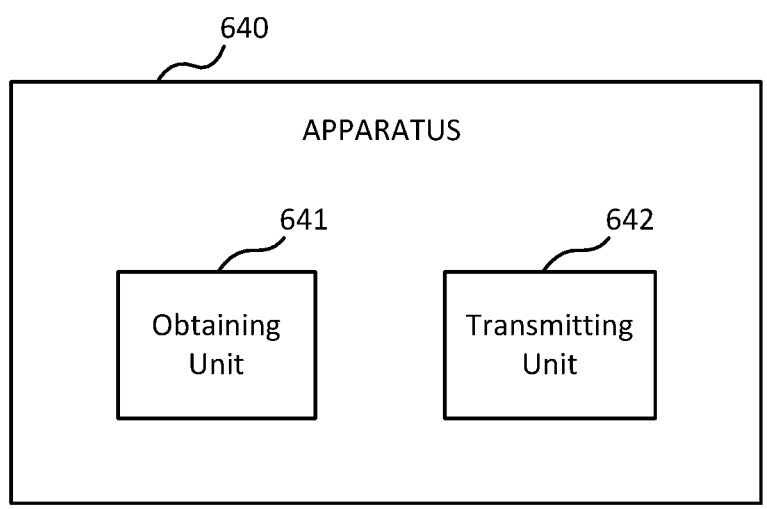
FIG. 6D is a block diagram illustrating an apparatus according to some embodiments of the present disclosure.

FIG. 6D is a block diagram illustrating an apparatus 640 according to another embodiment of the present disclosure. As shown in FIG. 6D, the apparatus 640 may comprise an obtaining unit 641 and a transmitting unit 642. In an exemplary embodiment, the apparatus 640 may be implemented at a network node such as a MN. The obtaining unit 641 may be operable to carry out the operation in block 612, and the transmitting unit 642 may be operable to carry out the operation in block 614. Optionally, the obtaining unit 641 and/or the transmitting unit 642 may be operable to carry out more or less operations to implement the proposed methods according to the exemplary embodiments of the present disclosure.

Figure 6E:
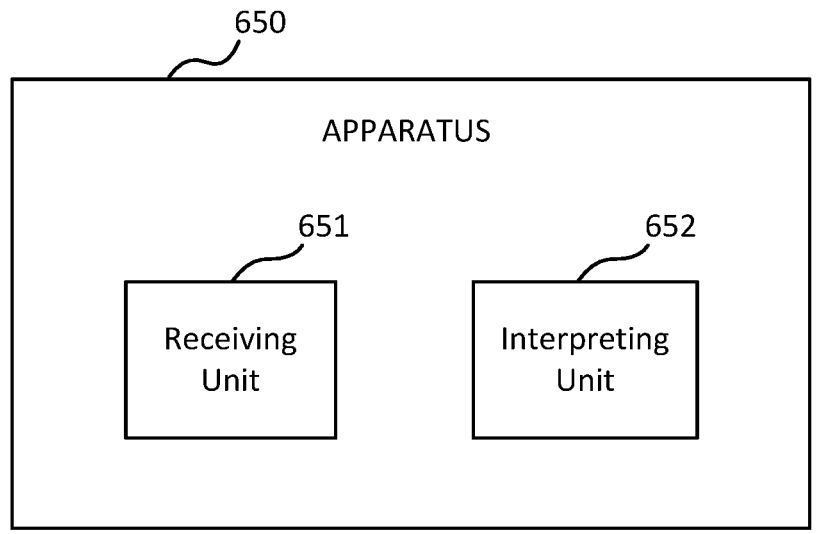
FIG. 6E is a block diagram illustrating an apparatus according to some embodiments of the present disclosure.

FIG. 6E is a block diagram illustrating an apparatus 650 according to some embodiments of the present disclosure. As shown in FIG. 6E, the apparatus 650 may comprise a receiving unit 651 and an interpreting unit 652. In an exemplary embodiment, the apparatus 650 may be implemented at a network node such as a first SN. The receiving unit 651 may be operable to carry out the operation in block 622, and the interpreting unit 652 may be operable to carry out the operation in block 624. Optionally, the receiving unit 651 and/or the interpreting unit 652 may be operable to carry out more or less operations to implement the proposed methods according to the exemplary embodiments of the present disclosure.

Figure 6F:
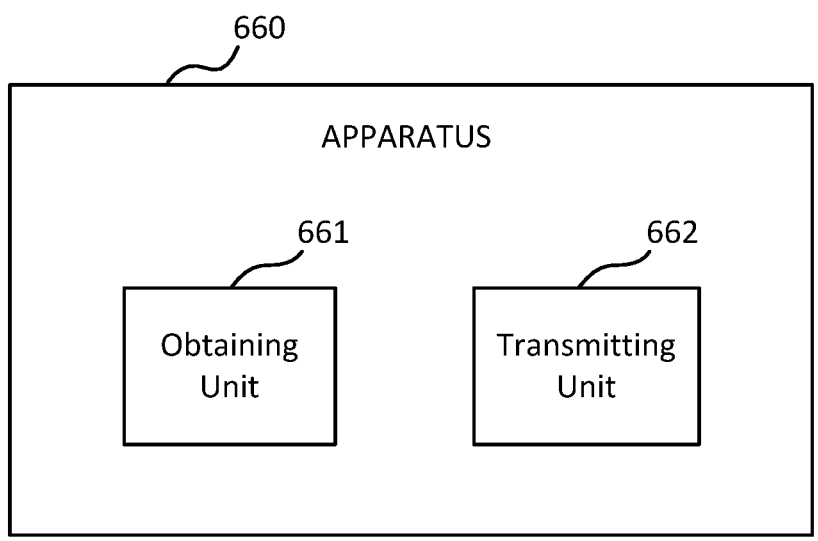
FIG. 6F is a block diagram illustrating an apparatus according to some embodiments of the present disclosure.

FIG. 6F is a block diagram illustrating an apparatus 660 according to some embodiments of the present disclosure. As shown in FIG. 6F, the apparatus 660 may comprise an obtaining unit 661 and a transmitting unit 662. In an exemplary embodiment, the apparatus 660 may be implemented at a network node such as a second SN. The obtaining unit 661 may be operable to carry out the operation in block 632, and the transmitting unit 662 may be operable to carry out the operation in block 634. Optionally, the obtaining unit 661 and/or the transmitting unit 662 may be operable to carry out more or less operations to implement the proposed methods according to the exemplary embodiments of the present disclosure.

In accordance with some exemplary embodiments, the enhancement to the frequency information in a report (such as a failure report or a measurement report) may be implemented by adding some information about at least one of Option I and Option II. The information about Option I may comprise a frequency location where the synchronization signal/physical broadcast channel (SS/PBCH) block is transmitted. The information about Option II may comprise a reference location from which the channel state information-reference signal (CSI-RS) frequency location can be derived.

For the information about Option I, one possibility is to encode that with the synchronization raster channel numbering, which is also known as global synchronization channel number (GSCN). Another possibility is to encode that with the channel raster channel numbering, which is also known as absolute radio frequency channel number (ARFCN). A further possibility is to encode that with one or multiple offsets from a reference frequency, which can be the GSCN or the ARFCN. Compared with the information about Option I, the information about Option II may be the so-called frequency location of point A.

In accordance with an exemplary embodiment, the information about at least one of Option I and Option II may be included as frequency information in a failure/measurement report, regardless of which type of measurements are to be included in the failure/measurement report.

In accordance with an exemplary embodiment, the information about Option I may be included as frequency information in a failure/measurement report, if a terminal device such as a UE is intended to include SS/PBCH block based measurements in the failure/measurement report.

In accordance with an exemplary embodiment, the information about Option II may be included as frequency information in a failure/measurement report, if a terminal device such as a UE is intended to include CSI-RS based measurements in the failure/measurement report. In this case, additional CSI-RS frequency information may also be included, for example, exact frequency resources with which the CSI-RS resources are being transmitted.

Figure 7A:
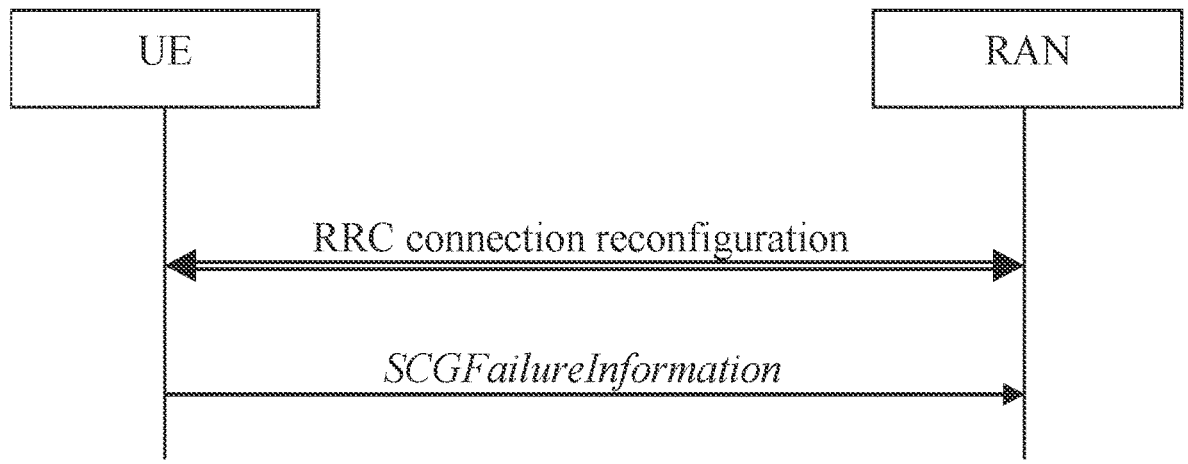
FIG. 7A is a diagram illustrating a failure procedure according to an embodiment of the present disclosure.

FIG. 7A is a diagram illustrating a failure procedure according to an embodiment of the present disclosure. The purpose of this procedure is to inform an Evolved Universal Terrestrial Radio Access Network (EUTRAN) or NR MN about a SCG failure a UE has experienced, for example, a SCG radio link failure, a SCG change failure, a SCG configuration failure for RRC message on SRB3, a SCG integrity check failure and exceeding the maximum uplink transmission timing difference.

In accordance with the exemplary embodiment, the UE may initiate the procedure to report SCG failures to a radio access network (RAN) when SCG transmission is not suspended and when one of the following conditions is met:
  upon detecting radio link failure for the SCG;
  upon reconfiguration with synchronization failure of the SCG;
  upon stopping uplink transmission towards the SCG's SpCell due to exceeding the maximum uplink transmission timing difference;
  upon SCG configuration failure; and
  upon integrity check failure indication from SCG lower layers.

According to an exemplary embodiment, in response to initiating the procedure, the UE may:
  suspend SCG transmission for all SRBs and DRBs;
  reset SCG-MAC;
  stop T304, if running; and
  if the UE is operating in EN-DC: initiate transmission of the SCGFailureInformation message, for example, as specified in 3GPP TS 36.331.

In accordance with an exemplary embodiment, the UE may set the SCG failure type as follows:
  if the UE initiates transmission of the SCGFailureInformation message to provide SCG radio link failure information: set the failureType as the trigger for detecting SCG radio link failure;
  else if the UE initiates transmission of the SCGFailureInformation message to provide reconfiguration with sync failure information for an SCG: set the failureType as scg-ChangeFailure;
  else if the UE initiates transmission of the SCGFailureInformation message due to exceeding maximum uplink transmission timing difference: set the failureType as maxUL-TimingDiff;
  else if the UE initiates transmission of the SCGFailureInformation message due to SRB3 IP check failure: set the failureType as srb3-IntegrityFailure; and
  else if the UE initiates transmission of the SCGFailureInformation message due to Reconfiguration failure of NR RRC reconfiguration message: set the failureType as scg-reconfigFailure.

In accordance with an exemplary embodiment, the UE may set the contents of the MeasResultSCG-Failure as follows:

set the measResultServFreqList to include for each SCG cell that is configured by the SN to be measured, if any, within measResultServingCell the quantities of the concerned SCell, if available, according to specific performance requirements;
set the measResultServFreqList to include the SS/PBCH block frequency location for each SCG cell that is configured by the SN to be measured, if any, within measResultServingCell, if SS/PBCH block measurements are available to be included.
set the measResultServFreqList to include the SS/PBCH block frequency location for each SCG cell that is configured by the SN to be measured, if any, within measResultServingCell, if SS/PBCH block measurements are available to be included.
for each SCG serving frequency included in measResultServFreqList, include within measResultBestNeighCell the physCellId and the quantities of the best non-serving cell, based on reference signal receiving power (RSRP), on the concerned serving frequency;
set the measResultNeighCells to include the best measured cells on non-serving NR frequencies, ordered such that the best cell is listed first, and based on measurements collected up to the moment the UE detected the failure, and set its fields as follows: (a) if the UE was configured to perform measurements by the SN for one or more non-serving NR frequencies and measurement results are available, include the measResultListNR; and (b) for each neighbour cell included, include the optional fields that are available.

In accordance with an exemplary embodiment, the measured quantities may be filtered by the L3 filter as configured in the mobility measurement configuration. The measurements are based on the time domain measurement resource restriction, if configured. Blacklisted cells are not required to be reported.

In accordance with an exemplary embodiment, an ARFCN-ValueNR information element (IE) may be used to indicate the ARFCN applicable for a downlink, uplink or bi-directional (such as time division duplex (TDD)) NR global frequency raster, as defined in 3GPP TS 38.101. The following is an example of the ARFCN-ValueNR IE.

```
-- ASN1START
-- TAG-ARFCN-VALUE-NR-START
ARFCN-ValueNR ::=                          CHOICE {
            -- Absolute carrier frequency in number of multiples of 5kHz. Applicable for the frequency range from 0 to 3GHz.
            -- Corresponds to parameter 'N_REF' (see 38.101, section FFS_Section)
            lowCarrierFrequency                 INTEGER (0..599999),
            -- Absolute carrier frequency in number of multiples of 15kHz. Applicable for the frequency range from 3GHz to 24GHz
            -- Corresponds to parameter 'N_REF' (see 38.101, section FFS_Section)
            midCarrierFrequency                 INTEGER (600000..1999999),
            -- Absolute carrier frequency in number of multiples of 60kHz. Applicable for the frequency range from 24GHz to 100GHz
            -- Corresponds to parameter 'N_REF' (see 38.101, section FFS_Section)
            highCarrierFrequency        INTEGER (2000000..3266667)
}
-- TAG-ARFCN-VALUE-NR-STOP
-- ASN1STOP
```

In accordance with an exemplary embodiment, a GSCN-ValueNR IE may be used to indicate the frequency positions of the SS/PBCH blocks, as defined in 3GPP TS 38.101. An example of the GSCN-ValueNR IE is provided as below, where a field of FrequencyOffsetSSB may be optional.

```
-- ASN1START
-- TAG-GSCN-VALUE-NR-START
GSCN-ValueNR ::=                        CHOICE {
            -- Frequency raster index and offset for 0 - 2,65 GHz. Corresponds to parameter 'N' (see 38.101, section
FFS_Section)
            lowCarrierFrequency                 SEQUENCE {
                frequencyIndex                  INTEGER (1..2944),
                -- An offset of −5kHz (M=−1) or +5kHz (M=1) to the absoluteFrequencySSB. When the field is absent,
the UE applies no offset (M=0).
                -- The offset is only applicable for the frequency range 0-2.65GHz. Corresponds to parameter 'M' (see
38.101, section FFS_Section)
                frequencyOffsetSSB              FrequencyOffsetSSB
                OPTIONAL        -- Need R
            },
            -- Frequency raster index for 2.4GHz - 24,25 GHz. Corresponds to parameter 'N' (see 38.101, section
FFS_Section)
            midCarrierFrequency                 INTEGER (0..15173),
            -- Frequency raster index for 24.25-100GHz range. Corresponds to parameter 'N' (see 38.101, section
FFS_Section)
            highCarrierFrequency                INTEGER (0..4383)
}
FrequencyOffsetSSB ::=                  ENUMERATED { minus5kHz, plus5kHz }
-- TAG-GSCN-VALUE-NR-STOP
-- ASN1STOP
```

Figure 7B:
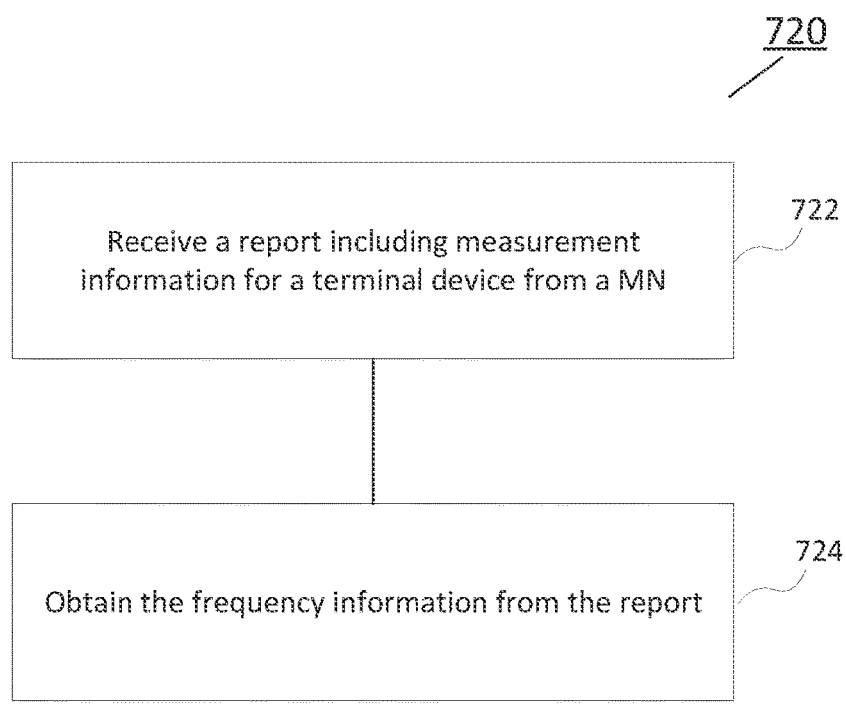
FIG. 7B is a flowchart illustrating a method according to some embodiments of the present disclosure.

In accordance with an exemplary embodiment, a MeasResultSCG-Failure IE may be used to provide information regarding failures detected by the UE in case of EN-DC. The following is an example of the MeasResultSCG-Failure IE, where some field such as refFreqCSI-RS, ARFCN-ValueNR, measResultBestNeighCell, and MeasResultNR may be optional.

plary method 720 illustrated in FIG. 7B, the SN may receive a report including measurement information for a terminal device from a network node operating as an MN, as shown in block 722. The terminal device may be connected at least to the MN. The report may indicate frequency information for the measurement information. As shown in block 724, the SN may obtain the frequency information from the

```
-- ASN1START
-- TAG-MEAS-RESULT -SCG-FAILURE-START
-- FFS if failureType is needed
MeasResultSCG-Failure ::=               SEQUENCE {
        measResultServFreqList                  MeasResultServFreqList2NR,
        measResultNeighCells                    MeasResultList2NR,
        ...
}
MeasResultServFreqList2NR ::=           SEQUENCE   (SIZE   (1..maxNrofServingCells))   OF
MeasResultServFreq2NR
MeasResultServFreq2NR ::=               SEQUENCE {
        ssbAbsoluteFreq                                 GSCN-ValueNR,
        refFreqCSI-RS                                   ARFCN-ValueNR
            OPTIONAL,
        measResultServingCell                           MeasResultNR,
        measResultBestNeighCell                 MeasResultNR    OPTIONAL
}
MeasResultList2NR ::=                   SEQUENCE (SIZE (1..maxFreq)) OF MeasResult2NR
MeasResult2NR ::=                       SEQUENCE {
        carrierFreq                                     ARFCN-ValueNR,
        measResultListNR                                MeasResultListNR
}
-- TAG-MEAS-RESULT -SCG-FAILURE-STOP
-- ASN1STOP
```

The third proposed solution according to some exemplary embodiments may enable a network node to identify that SS/PBCH block measurements are associated with a particular frequency location, and/or CSI-RS measurements are associated with a particular frequency location, instead of having the generic carrier information. In accordance with an exemplary embodiment, the network node may comprise network entity supporting LTE, NR, 5G or other proper radio technologies, such as a eNB or a gNB.

FIG. 7B is a flowchart illustrating a method 720 according to some embodiments of the present disclosure. The method 720 illustrated in FIG. 7B may be performed by an apparatus implemented in a network node operating as an SN or communicatively coupled to the SN. According to the exemreport. The frequency information may comprise at least one of a frequency location of a synchronization signal and a frequency location of a reference signal.

In accordance with an exemplary embodiment, the frequency information may further comprise an offset of a synchronization signal block (SSB). In accordance with an exemplary embodiment, the frequency location of the synchronization signal may comprise a frequency location where the synchronization signal/physical broadcast channel (SS/PBCH) block is transmitted. In accordance with an exemplary embodiment, the frequency location of the reference signal may comprise a reference location from which the channel state information-reference signal (CSI-RS) frequency location can be derived.

Figure 7C:
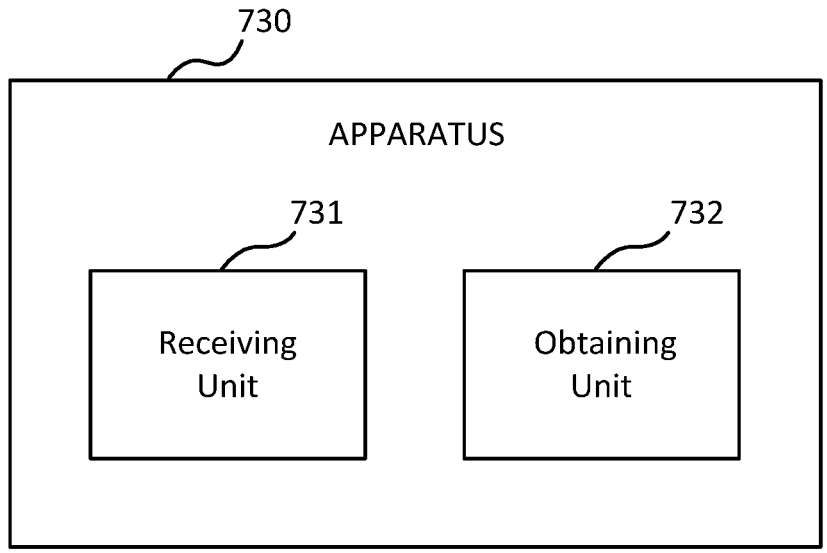
FIG. 7C is a block diagram illustrating an apparatus according to some embodiments of the present disclosure.

FIG. 7C is a block diagram illustrating an apparatus 730 according to some embodiments of the present disclosure. As shown in FIG. 7C, the apparatus 730 may comprise a receiving unit 731 and an obtaining unit 732. In an exemplary embodiment, the apparatus 730 may be implemented in a network node operating as an SN. The receiving unit 731 may be operable to carry out the operation in block 722, and the obtaining unit 732 may be operable to carry out the operation in block 724. Optionally, the receiving unit 731 and/or the obtaining unit 732 may be operable to carry out more or less operations to implement the proposed methods according to the exemplary embodiments of the present disclosure.

The various blocks shown in FIGS. 5A-5C, FIGS. 6A-6C and FIG. 7B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
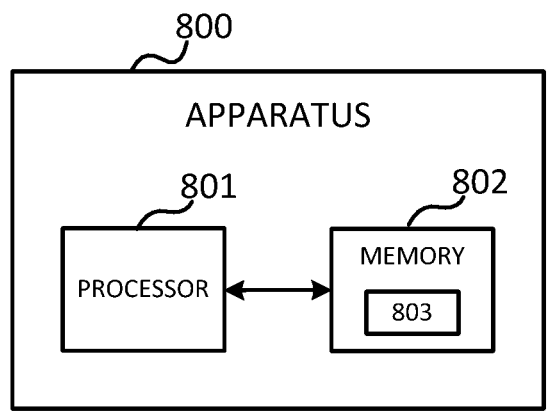
FIG. 8 is a block diagram illustrating an apparatus according to some embodiments of the present disclosure.

FIG. 8 is a block diagram illustrating an apparatus 800 according to various embodiments of the present disclosure. As shown in FIG. 8, the apparatus 800 may comprise one or more processors such as processor 801 and one or more memories such as memory 802 storing computer program codes 803. The memory 802 may be non-transitory machine/processor/computer readable storage medium. In accordance with some exemplary embodiments, the apparatus 800 may be implemented as an integrated circuit chip or module that can be plugged or installed into a network node or a terminal device.

In some implementations, the one or more memories 802 and the computer program codes 803 may be configured to, with the one or more processors 801, cause the apparatus 800 at least to perform any operation of the method as described in connection with any of FIGS. 5A-5C. In other implementations, the one or more memories 802 and the computer program codes 803 may be configured to, with the one or more processors 801, cause the apparatus 800 at least to perform any operation of the method as described in connection with any of FIGS. 6A-6C. In further implementations, the one or more memories 802 and the computer program codes 803 may be configured to, with the one or more processors 801, cause the apparatus 800 at least to perform any operation of the method as described in connection with FIG. 7B. In accordance with some exemplary embodiments, the one or more memories 802 and the computer program codes 803 may be configured to, with the one or more processors 801, cause the apparatus 800 at least to perform any operation of any method according to the fourth proposed solution.

Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

In accordance with some exemplary embodiments of the fourth proposed solution, there is provided a method implemented at a terminal device. The method may comprise obtaining measurement information based at least in part on configurations of a MN and a SN. The terminal device is connected to the MN and the SN. The method may further comprise transmitting a report including the measurement information that comprises frequency information to the MN, in response to a failure related to the SN.

In accordance with some exemplary embodiments of the fourth proposed solution, there is provided a method implemented at a network node. The method may comprise receiving a report including measurement information that comprises frequency information from a terminal device which is connected at least to the network node, in response to a failure related to another network node. The network node is configured to operate as a MN for the terminal device, and the another network node is configured to operate as a SN for the terminal device. The measurement information is based at least in part on configurations of the MN and the SN. The method may further comprise interpreting the measurement information. Optionally, the method may further comprise determining another SN for the terminal device, based at least in part on the measurement information, and transmitting at least part of the measurement information to the another SN.

In accordance with some exemplary embodiments of the fourth proposed solution, there is provided a method implemented at a network node. The method may comprise receiving a report including measurement information that comprises frequency information for a terminal device from another network node which is connected to the terminal device. The network node is configured to operate as a SN for the terminal device, and the another network node is configured to operate as a MN for the terminal device. The measurement information is based at least in part on configurations of the MN and another SN for the terminal device. The method may further comprise interpreting the measurement information.

In accordance with some exemplary embodiments, the frequency information may comprise information about at least one of a frequency location of a synchronization signal and a frequency location of a reference signal.

In accordance with some exemplary embodiments, the frequency location of the synchronization signal may comprise a frequency location where a synchronization signal block is transmitted.

In accordance with some exemplary embodiments, the frequency information may further comprise an offset of the synchronization signal block.

In accordance with some exemplary embodiments, the information about the frequency location of the reference signal may comprise a reference location from which a channel state information-reference signal (CSI-RS) frequency location is derivable.

In accordance with some exemplary embodiments, the frequency information may comprise at least one absolute radio frequency channel number.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device connected to a master network node and a secondary network node, comprising:
   obtaining measurement results based on configurations of the master network node and the secondary network node, the measurement results associated with serving frequencies configured by the master network node and the secondary network node; and
   in response to a failure related to the secondary network node to which the terminal device was connected, transmitting, to the master network node, a report including the measurement results and frequency information associated with the secondary network node, wherein the frequency information comprises information about a frequency location of a synchronization signal and a frequency location of a reference signal wherein the frequency location of the synchronization signal is provided by a first new radio, NR, absolute radio frequency channel number, ARFCN, ARFCN-ValueNR, and the frequency location of the reference signal is provided by a second ARFCN-ValueNR, wherein the report indicates an association between a serving frequency configured by the secondary network node and measurement result associated with the serving frequency.

2. The method according to claim 1, wherein the frequency information further comprises an offset of a synchronization signal block.

3. The method according to claim 1, wherein a second frequency location of the reference signal comprises a reference location from which a channel state information-reference signal frequency location is derivable.

4. An apparatus implemented in a terminal device connected to a master network node and a secondary network node, comprising:
   one or more processors; and
   one or more memories comprising computer program codes,
   the one or more memories and the computer program codes configured to, with the one or more processors, cause the apparatus at least to:
      obtain measurement results based on configurations of the master network node and the secondary network node, the measurement results associated with serving frequencies configured by the master network node and the secondary network node; and
      in response to a failure related to the secondary network node to which the terminal device was connected, transmit, to the master network node, a report including the measurement results and frequency information associated with the secondary network node, wherein the frequency information comprises information about a frequency location of a synchronization signal and a frequency location of a reference signal wherein the frequency location of the synchronization signal is provided by a first new radio, NR, absolute radio frequency channel number, ARFCN, ARFCN-ValueNR, and the frequency location of the reference signal is provided by a second ARFCN-ValueNR, wherein the report indicates an association between a serving frequency configured by the secondary network node and measurement result associated with the serving frequency.

5. The apparatus according to claim 4, wherein a second frequency location of the reference signal comprises a reference location from which a channel state information-reference signal frequency location is derivable.

6. A method implemented at a master network node, comprising:
   receiving, in response to a failure related to a secondary network node to which a terminal device is connected, from the terminal device, a report including frequency information associated with the secondary network node and measurement results based on configurations of the master network node and the secondary network node, the measurement results associated with serving frequencies configured by the master network node and the secondary network node, wherein the frequency information comprises information about a frequency location of a synchronization signal and a frequency location of a reference signal wherein the frequency location of the synchronization signal is provided by a first new radio, NR, absolute radio frequency channel number, ARFCN, ARFCN-ValueNR, and the frequency location of the reference signal is provided by a second ARFCN-ValueNR, wherein the report indicates an association between a serving frequency configured by the secondary network node and measurement result associated with the serving frequency.

7. The method of claim 6, wherein the frequency information further comprises an offset of a synchronization signal block.

8. The method of claim 6, wherein a second frequency location of the reference signal comprises a reference location from which a channel state information-reference signal frequency location is derivable.

9. An apparatus implemented in a master network node, comprising:
 one or more processors; and
 one or more memories comprising computer program codes,
 the one or more memories and the computer program codes configured to, with the one or more processors, cause the apparatus at least to:
  receive, in response to a failure related to a secondary network node to which a terminal device is connected, from the terminal device, a report including frequency information associated with the secondary network node and measurement results based on configurations of the master network node and the secondary network node, the measurement results associated with serving frequencies configured by the master network node and the secondary network node, wherein the frequency information comprises information about a frequency location of a synchronization signal and a frequency location of a reference signal wherein the frequency location of the synchronization signal is provided by a first new radio, NR, absolute radio frequency channel number, ARFCN, ARFCN-ValueNR, and the frequency location of the reference signal is provided by a second ARFCN-ValueNR, wherein the report indicates an association between a serving frequency configured by the secondary network node and measurement result associated with the serving frequency.

10. The apparatus of claim 9, wherein the frequency information further comprises an offset of a synchronization signal block.

11. The apparatus of claim 9, wherein a second frequency location of the reference signal comprises a reference location from which a channel state information-reference signal frequency location is derivable.

* * * * *

UNITED STATES PATENT AND TRADEMARK OFFICE
CERTIFICATE OF CORRECTION

PATENT NO. : 11,889,334 B2
APPLICATION NO. : 16/284230
DATED : January 30, 2024
INVENTOR(S) : Fan et al.

It is certified that error appears in the above-identified patent and that said Letters Patent is hereby corrected as shown below:

On the Title Page

In Item (57), under "ABSTRACT", in Column 1, Line 5, delete "configurations of" and insert -- configurations from --, therefor.

On Page 2, in Item (56), under "OTHER PUBLICATIONS", in Column 1, Line 1, delete "Scwarz," and insert -- Schwarz, --, therefor.

On Page 2, in Item (56), under "OTHER PUBLICATIONS", in Column 2, Line 8, delete "Overal" and insert -- Overall --, therefor.

On Page 2, in Item (56), under "OTHER PUBLICATIONS", in Column 2, Line 58, delete "2017 ," and insert -- 2017, --, therefor.

In the Drawings

In Fig. 5A, Sheet 3 of 10, and on the Title Page, the illustrative print figure, for Tag "512", Line 2, delete "configurations of" and insert -- configurations from --, therefor.

In the Specification

In Column 1, Line 39, delete "cross" and insert -- across --, therefor.

In Column 1, Line 42, delete "configurations of" and insert -- configurations from --, therefor.

In Column 2, Line 7, delete "configurations of" and insert -- configurations from --, therefor.

In Column 2, Line 41, delete "configurations of" and insert -- configurations from --, therefor.

Signed and Sealed this
Twenty-sixth Day of August, 2025

Coke Morgan Stewart
*Acting Director of the United States Patent and Trademark Office*

CERTIFICATE OF CORRECTION (continued)
U.S. Pat. No. 11,889,334 B2

In Column 3, Line 19, delete "configurations of" and insert -- configurations from --, therefor.

In Column 4, Line 37, delete "configurations of" and insert -- configurations from --, therefor.

In Column 7, Line 51, delete "configurations of" and insert -- configurations from --, therefor.

In Column 8, Lines 22-23, delete "configurations of" and insert -- configurations from --, therefor.

In Column 8, Line 63, delete "configurations of" and insert -- configurations from --, therefor.

In Column 14, Line 62, delete "configurations of" and insert -- configurations from --, therefor.

In Column 16, Line 47, delete "inform it" and insert -- inform --, therefor.

In Column 17, Line 10, delete "configurations of" and insert -- configurations from --, therefor.

In Column 17, Line 29, delete "configurations of" and insert -- configurations from --, therefor.

In Column 17, Line 44, delete "configurations of" and insert -- configurations from --, therefor.

In Column 19, Line 28, delete "they" and insert -- if they --, therefor.

In Column 23, Line 28, delete "configurations of" and insert -- configurations from --, therefor.

In Column 28, Line 60, delete "(EUTRAN)" and insert -- (E-UTRAN) --, therefor.

In Column 30, Line 10, delete "included." and insert -- included; --, therefor.

In Column 30, Line 15, delete "included." and insert -- included; --, therefor.

In Column 30, Lines 20-21, delete "reference signal receiving power (RSRP)," and insert -- reference signal received power (RSRP), --, therefor.

In Column 34, Line 2, delete "configurations of" and insert -- configurations from --, therefor.

In Column 34, Line 17, delete "configurations of" and insert -- configurations from --, therefor.

In Column 34, Lines 33-34, delete "configurations of" and insert -- configurations from --, therefor.

In the Claims

In Column 35, Line 49, in Claim 1, delete "configurations of" and insert -- configurations from --, therefor.

In Column 36, Line 20, in Claim 4, delete "configurations of" and insert -- configurations from --, therefor.

In Column 36, Lines 52-53, in Claim 6, delete "configurations of" and insert -- configurations from --, therefor.

In Column 37, Line 21, in Claim 9, delete "configurations of" and insert -- configurations from --, therefor.